(12) United States Patent
Ouderkirk

(10) Patent No.: US 6,396,631 B1
(45) Date of Patent: May 28, 2002

(54) LIGHT FIXTURE HAVING A MULTILAYER POLYMERIC FILM

(75) Inventor: Andrew J. Ouderkirk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/592,504

(22) Filed: Jun. 12, 2000

Related U.S. Application Data

(62) Division of application No. 08/479,319, filed on Jun. 7, 1995, now Pat. No. 6,101,032, which is a division of application No. 08/418,009, filed on Apr. 6, 1995, now abandoned, which is a division of application No. 08/223,548, filed on Apr. 6, 1994, now abandoned.

(51) Int. Cl.$^7$ ............... G02B 5/30; F21V 9/14; F21V 7/00

(52) U.S. Cl. ............ 359/500; 359/498; 359/495; 359/487; 362/19; 362/257; 362/260; 362/296; 428/212; 428/421; 428/480; 428/483; 428/522

(58) Field of Search ............... 359/485, 487, 359/488, 490, 495, 498, 500, 584, 589; 362/19, 257, 260, 296; 428/212, 421, 480, 483, 522

(56) References Cited

U.S. PATENT DOCUMENTS

| 540,768 A | 6/1895 | Western |
| 2,432,867 A | * 12/1947 | Dreyer ............ 359/490 |
| 2,776,598 A | 1/1957 | Dreyer ............ 88/105 |
| 3,124,639 A | 3/1964 | Kahn ............ 88/63 |

(List continued on next page.)

FOREIGN PATENT DOCUMENTS

| CA | 1327286 | 3/1994 | ............ 88/113.18 |
| EP | 488 544 | 11/1991 | ............ G02B/5/30 |
| EP | 552 725 | 7/1993 | ............ G02B/27/28 |

(List continued on next page.)

OTHER PUBLICATIONS

Schrenk et al., Nanolayer polymeric optical films, Tappi Journal, pp. 169–174, Jun., 1992.

Alfrey, Jr. et al., Physical Optics of Iridescent Multilayered Plastic Films, Polymer Engineering and Science, vol. 9, No. 6, Nov. 1969; pp 400–404.

Baba et al., Optical anisotropy of stretched gold island films: experimental results, Optics Letters, vol. 17, No. 8, Apr. 15, 1992; pp 622–624.

Radford et al., Reflectivity of Iridescent Coextruded Multi-layered Plastic Films, Polymer Engineering and Science, vol. 13, No. 3, (May 1973); Dow Chemical Co., American Chemical Society Symposium on "Coextruded Plastic Films, Fibers, Composites", Apr. 9–14, 1972; pp 216–221.

Schrenk et al., Coextruded Elastomeric Optical Interference Films, SPE Annual Technical Conference, Atlanta, Georgia, (1988); pp 1703–1707.

Schrenk et al., Interfacial Flow Instability in Multilayer Coextrusion, Polymer Engineering and Science, vol. 18(8), p. 620–3 (Jun. 1978).

Schrenk et al., Coextruded Multilayer Polymer Films and Sheet, Chapt. 15, Polymer Blends, vol. 2, Academic Press, Inc. (1978); pp 129–165.

(List continued on next page.)

*Primary Examiner*—Ricky D. Shafer
(74) *Attorney, Agent, or Firm*—John A. Burtis; Stephen C. Jensen

(57) ABSTRACT

A polarized light source includes a diffuse light source and a reflective polarizing element placed: proximate thereto. The reflective polarizing element transmits light of a desired polarization and reflects light of another polarization back into the diffuse source where it is randomized. Some of the initially rejected light is thus converted into the desired polarization and is transmitted through the reflective polarizing element. This process continues, and the repeated reflections and subsequent randomization of light of the undesired polarization increases the amount of light of the desired polarization that is emitted by the polarized light source.

9 Claims, 23 Drawing Sheets

U.S. PATENT DOCUMENTS

| | | | |
|---|---|---|---|
| 3,213,753 A | 10/1965 | Rogers | 88/65 |
| 3,423,498 A | 1/1969 | Lefevre | 264/171 |
| 3,480,502 A | 11/1969 | Schrenk | 156/271 |
| 3,498,873 A | 3/1970 | Schrenk | 161/109 |
| 3,556,635 A | 1/1971 | Schrenk et al. | 350/96 |
| 3,565,985 A | 2/1971 | Schrenk et al. | 264/171 |
| 3,610,729 A | 10/1971 | Rogers | 350/157 |
| 3,631,288 A | 12/1971 | Rogers | 313/117 |
| 3,647,612 A | 3/1972 | Schrenk et al. | 161/165 |
| 3,711,176 A | 1/1973 | Alfrey, Jr. et al. | 350/1 |
| 3,712,980 A | 1/1973 | Norton | 240/47 |
| 3,746,485 A | 7/1973 | Schrenk | 425/131 |
| 3,759,647 A | 9/1973 | Schrenk et al. | 425/131 |
| 3,773,882 A | 11/1973 | Schrenk | 264/171 |
| 3,801,429 A | 4/1974 | Schrenk et al. | 161/181 |
| 3,847,585 A | 11/1974 | Chisholm | 65/99 |
| 3,860,036 A | 1/1975 | Newman, Jr. | 138/45 |
| 3,912,920 A | 10/1975 | Kubota | 240/9.5 |
| 4,094,947 A | 6/1978 | Alfrey, Jr. et al. | 264/171 |
| 4,161,014 A | 7/1979 | Dey et al. | 362/263 |
| 4,190,832 A | 2/1980 | Mohler | 340/705 |
| 4,212,048 A | 7/1980 | Castleberry | 362/19 |
| 4,268,127 A | 5/1981 | Oshima et al. | 350/337 |
| 4,307,150 A | 12/1981 | Roche | 428/336 |
| 4,310,584 A | 1/1982 | Cooper et al. | 428/212 |
| 4,312,570 A | 1/1982 | Southwell | 350/166 |
| 4,315,258 A | 2/1982 | McKnight et al. | 340/784 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,540,623 A | 9/1985 | Im et al. | 428/220 |
| 4,542,449 A | 9/1985 | Whitehead | 362/330 |
| 4,586,790 A | 5/1986 | Umeda et al. | 350/337 |
| 4,590,119 A | 5/1986 | Kawakami et al. | 428/216 |
| 4,643,529 A | 2/1987 | Hosonuma et al. | 350/337 |
| 4,645,714 A | 2/1987 | Roche et al. | 428/458 |
| 4,666,263 A | 5/1987 | Petcavich | 350/640 |
| 4,706,173 A | 11/1987 | Hamada et al. | 362/341 |
| 4,719,546 A | 1/1988 | Spitz | 362/260 |
| 4,720,426 A | 1/1988 | Englert et al. | 428/344 |
| 4,756,953 A | 7/1988 | Utsumi | 428/220 |
| 4,796,160 A | 1/1989 | Kahn | 362/19 |
| 4,798,448 A | 1/1989 | van Raalte | 350/345 |
| 4,799,772 A | 1/1989 | Utsumi | 350/339 |
| 4,824,882 A | 4/1989 | Nakamura et al. | 524/89 |
| 4,896,942 A | 1/1990 | Onstott et al. | 350/96.33 |
| 4,906,068 A | 3/1990 | Olson et al. | 350/96.3 |
| 4,937,134 A | 6/1990 | Schrenk et al. | 428/213 |
| 5,042,921 A | 8/1991 | Sato et al. | 359/40 |
| 5,056,888 A | 10/1991 | Messerly et al. | 385/123 |
| 5,059,356 A | 10/1991 | Nakamura et al. | 252/585 |
| 5,089,318 A | 2/1992 | Shetty et al. | 428/212 |
| 5,094,788 A | 3/1992 | Schrenk et al. | 264/171 |
| 5,094,793 A | 3/1992 | Schrenk et al. | 264/171 |
| 5,095,210 A | 3/1992 | Wheatley et al. | 250/339 |
| 5,103,337 A | 4/1992 | Schrenk et al. | 359/359 |
| 5,122,905 A | 6/1992 | Wheatley et al. | 359/586 |
| 5,122,906 A | 6/1992 | Wheatley | 359/586 |
| 5,126,880 A | 6/1992 | Wheatley et al. | 359/587 |
| 5,139,340 A | 8/1992 | Okumura | 359/63 |
| 5,149,578 A | 9/1992 | Wheatley et al. | 428/213 |
| 5,157,526 A | 10/1992 | Kondo et al. | 359/63 |
| 5,184,881 A | 2/1993 | Karpen | 362/1 |
| 5,200,843 A | 4/1993 | Karasawa et al. | 359/40 |
| 5,202,074 A | 4/1993 | Schrenk et al. | 264/241 |
| 5,217,794 A | 6/1993 | Schrenk | 428/220 |
| 5,221,982 A | 6/1993 | Faris | 359/93 |
| 5,233,465 A | 8/1993 | Wheatley et al. | 359/359 |
| 5,234,729 A | 8/1993 | Wheatley et al. | 428/30 |
| 5,235,443 A | 8/1993 | Barnik et al. | 359/37 |
| 5,262,894 A | 11/1993 | Wheatley et al. | 359/586 |
| 5,269,995 A | 12/1993 | Ramanathan et al. | 264/171 |
| 5,278,680 A | 1/1994 | Karasawa et al. | 359/40 |
| 5,278,694 A | 1/1994 | Wheatley et al. | 359/359 |
| 5,286,418 A | 2/1994 | Nakamura et al. | 252/585 |
| 5,294,657 A | 3/1994 | Melendy et al. | 524/270 |
| 5,309,544 A | 5/1994 | Saxe | 385/146 |
| 5,316,703 A | 5/1994 | Schrenk | 264/1.3 |
| 5,319,478 A | 6/1994 | Fijinfschilling et al. | 359/53 |
| 5,339,198 A | 8/1994 | Wheatley et al. | 359/359 |
| 5,359,498 A | 10/1994 | Karpen | 362/19 |
| 5,360,659 A | 11/1994 | Arends et al. | 428/216 |
| 5,389,324 A | 2/1995 | Lewis et al. | 264/171 |
| 5,422,756 A * | 6/1995 | Weber | 359/487 |
| 5,424,119 A | 6/1995 | Phillips et al. | 428/328 |
| 5,448,404 A | 9/1995 | Schrenk et al. | 359/584 |
| 5,451,449 A | 9/1995 | Shetty et al. | 428/195 |
| 5,481,445 A | 1/1996 | Sitzema et al. | 362/308 |
| 5,486,935 A | 1/1996 | Kalamnash | 359/37 |
| 5,486,949 A | 1/1996 | Schrenk et al. | 359/498 |
| 5,540,978 A | 7/1996 | Schrenk | 428/212 |
| 5,552,927 A | 9/1996 | Wheatley et al. | 359/359 |
| 5,568,316 A | 10/1996 | Schrenk et al. | 359/584 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/46 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A * | 7/1998 | Ouderkirk et al. | |
| 5,793,456 A | 8/1998 | Broer et al. | 349/98 |
| 5,808,794 A | 9/1998 | Weber et al. | 359/487 |
| 5,808,798 A * | 9/1998 | Weber et al. | 359/583 |
| 5,825,542 A | 10/1998 | Cobb, Jr. et al. | 359/487 |
| 5,825,543 A | 10/1998 | Ouderkirk et al. | 359/494 |
| 5,867,316 A * | 2/1999 | Carlson et al. | 359/500 |
| 5,882,774 A | 3/1999 | Jonza et al. | 428/212 |
| 5,928,801 A | 7/1999 | Broer et al. | |
| 5,940,149 A | 8/1999 | Vanderwerf | 349/5 |
| 5,962,114 A | 10/1999 | Jonza et al. | 428/212 |
| 5,965,247 A | 10/1999 | Jonza et al. | 428/212 |
| 6,080,467 A * | 6/2000 | Weber et al. | 428/212 |
| 6,088,067 A * | 7/2000 | Willett et al. | |
| 6,101,032 A * | 8/2000 | Wortman et al. | 359/500 |

FOREIGN PATENT DOCUMENTS

| | | | |
|---|---|---|---|
| EP | 573 905 | 12/1993 | G02B/27/28 |
| JP | 63-55503 | 3/1988 | |
| JP | 5-288910 | 11/1993 | G02B/5/18 |
| JP | 6-11607 | 1/1994 | G02B/5/18 |
| WO | WO 91/09719 | 7/1991 | B29C/43/20 |
| WO | WO 95/27919 | 4/1995 | G02B/27/28 |
| WO | WO 95/17303 | 6/1995 | B32B/7/02 |
| WO | WO 95/17691 | 6/1995 | G02B/5/30 |
| WO | WO 95/17692 | 6/1995 | G02B/5/30 |
| WO | WO 95/17699 | 6/1995 | G02F/1/1335 |
| WO | WO 96/19347 | 6/1996 | B32B/7/02 |
| WO | WO 97/01440 | 1/1997 | B32B/27/36 |
| WO | WO 97/01774 | 1/1997 | G02B/1/10 |
| WO | WO 97/32226 | 9/1997 | G02B/5/30 |
| WO | WO 99/36248 | 7/1999 | B29C/47/70 |
| WO | WO 99/36262 | 7/1999 | B32B/27/00 |

OTHER PUBLICATIONS

Schrenk, W., New Developments in Coextrusion, International Conference on Advances In Polymer Processing, New Orleans, Louisiana, (Apr., 1991).

Schrenk, W. et al., Coextruded Infrared Reflecting Films, 7th Annual Meeting Polymer Processing Society, Hamilton, Ontario, Canada, p. 222–3 (Apr. 1991).

Weber, M., P–61: Retroreflecting Sheet Polarizer, SID 93 Digest, pp. 669–672 (1993).

Weber, M., 23:3: Retroreflecting Sheet Polarizer, SID 92 Digest, p. 427–9 (1992).

Wu et al., High Transparent Sheet Polarizer Made with Birefringent Materials, Jpn. J. of App. Phys., vol. 34, p. L997–9, part 2, No. 8A (Aug. 1995).

Ouderkirk, "Eelctroluminescent Light Source and Display Incorporating Same" USSN 09/62698, filed Jul. 27, 2000.

* cited by examiner

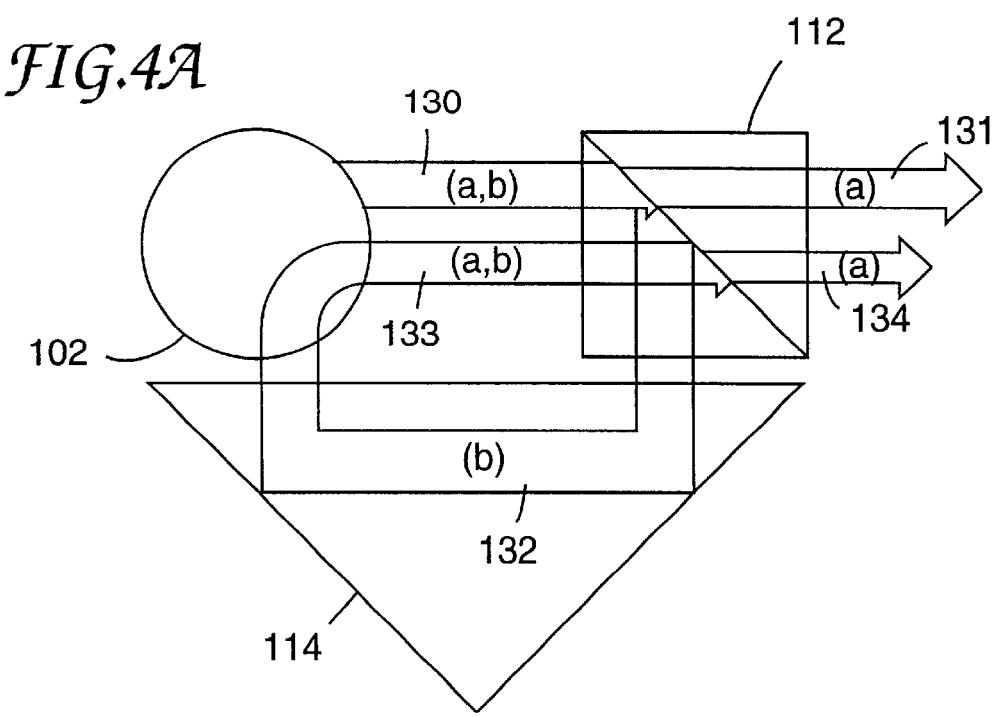
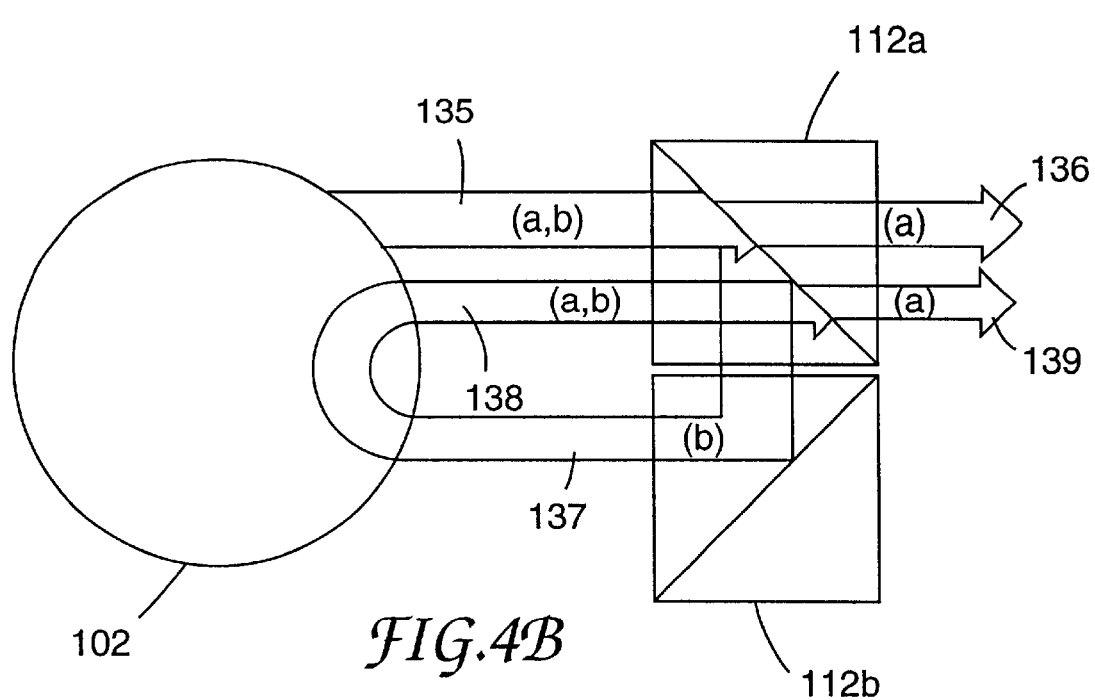

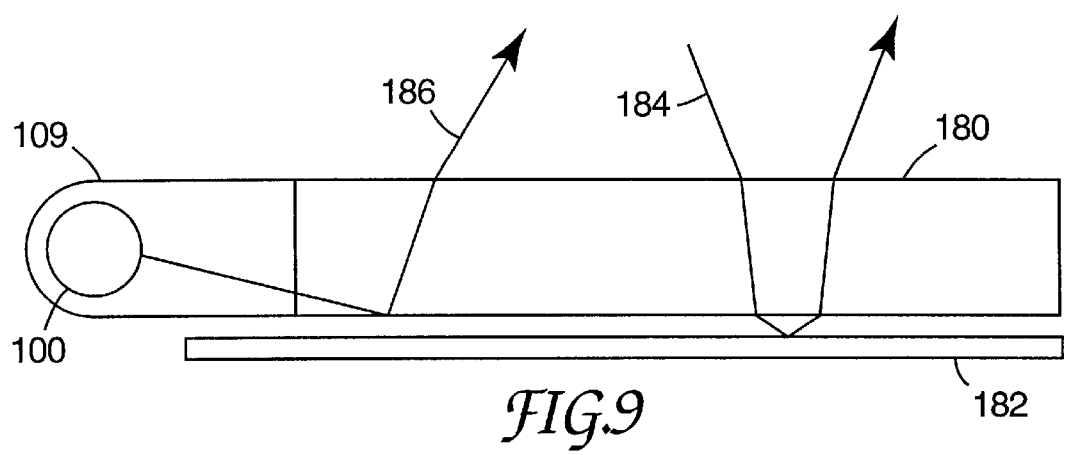
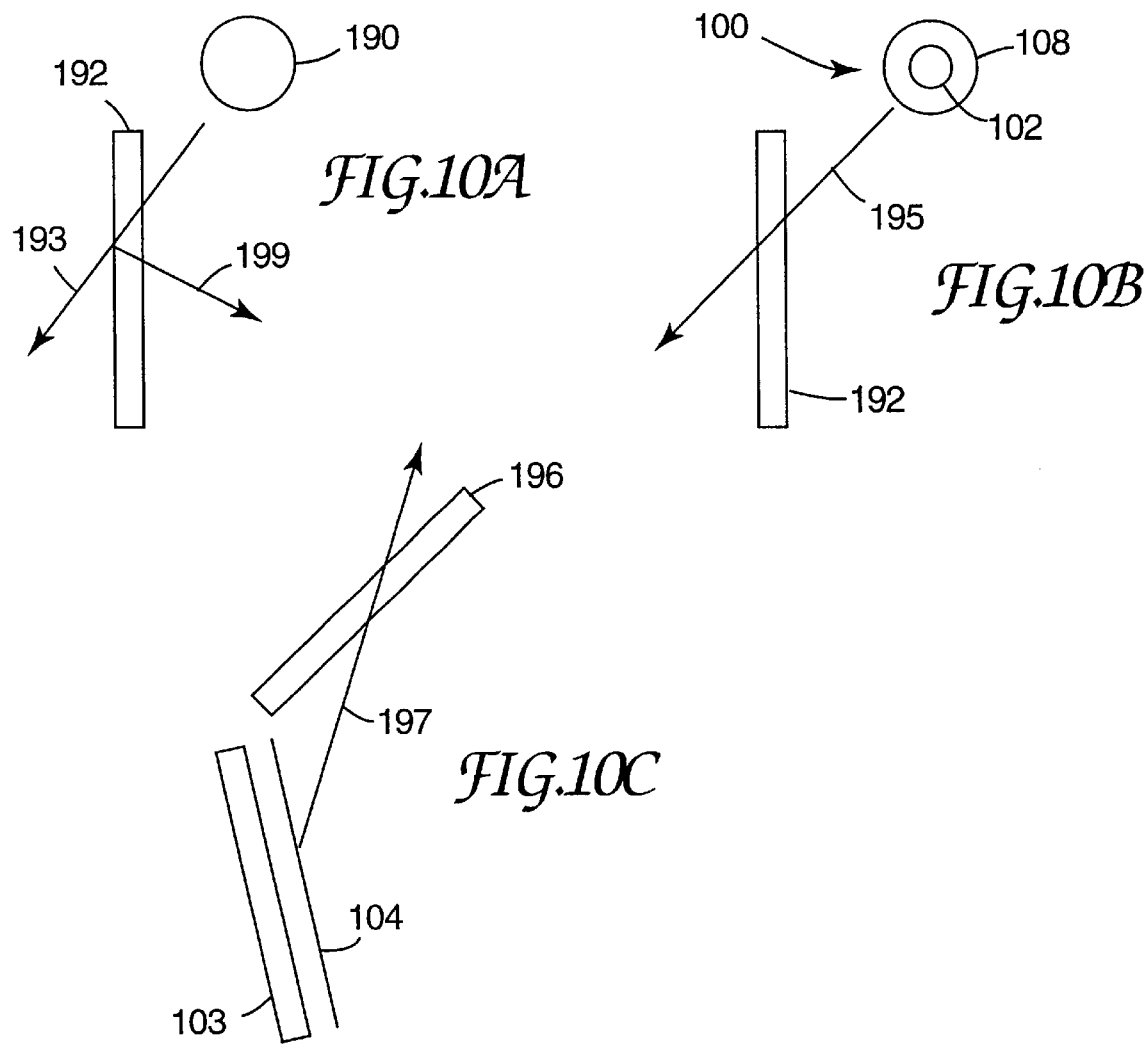

LIGHT FIXTURE HAVING A MULTILAYER POLYMERIC FILM

CROSS REFERENCE TO RELATED APPLICATIONS

This is a divisional of application Ser. No. 08/479,319 filed Jun. 7, 1995, now U.S. Pat. No. 6,101,032 which is a divisional of application Ser. No. 08/418,009, filed Apr. 6, 1995, now abandon which is a CIP of application Ser. No. 08/223,548, filed Apr. 6, 1994, now abandoned

TECHNICAL FIELD

The invention relates to light sources adapted to efficiently produce light of a particular polarization.

BACKGROUND

Many applications require polarized light to function properly. One example of such an application are optical displays, such as liquid crystal displays (LCDs), which are widely used for lap-top computers, hand-held calculators, digital watches, automobile dashboard displays and the like. Another such application is task lighting configurations for increased contrast and glare reduction.

To produce polarized light, a light source is typically coupled with one or more absorptive polarizers. These polarizers use dichroic dyes which transmit light of one polarization orientation more strongly than the orthogonal polarization orientation. Dichroic polarizers are very inefficient, however, in that light of the orthogonal polarization is largely absorbed and is therefore unavailable for application illumination. For example, a typical dichroic polarizer transmits only about 35–45% of the incident light emitted by a standard display backlight. This inefficiency is a major disadvantage to dichroic polarizers, as the light which is absorbed is not available for the associated application. In an LCD display, for example, the absorbed light does not contribute to the illumination, and thus the overall brightness, of the LCD.

Vacuum deposited, thin film dielectric polarizers are not absorbing, as are dichroic polarizers, but do suffer other disadvantages, such as poor angular response and poor spectral transmission for non-designed wavelengths. In addition, they are conventionally coated onto stable substrates, such as bulk optical glass or polymer substrates, which render them too bulky and heavy for use in applications requiring light weight and small profile.

Current technology, for LCD illumination, makes no attempt at polarization control other than use of inefficient, dichroic polarizers. Current technology, for glare reduction in task lighting and vehicle displays, does not use polarizers at all due to the inefficiencies of dichroics, and the bulk and angle performance of vacuum deposited dielectric polarizers.

SUMMARY

The present polarized light sources described herein include a diffuse light source and a reflective polarizing element placed proximate thereto. The reflective polarizing element transmits light of a desired polarization and reflects light of another polarization back into the diffuse source. The light of the rejected polarization is reflected back into the diffuse source and is randomized. Some of the initially rejected light is thus converted into the desired polarization and is transmitted through the reflective polarizing element. This process continues, and the repeated reflections and subsequent randomization of light of the undesired polarization increases the amount of light of the desired polarization that is emitted by the polarized light source.

The diffuse source consists of a light emitting region and a light reflecting, scattering and depolarizing region. The source may be a fluorescent lamp, incandescent lamp, solid-state source or electroluminescent (EL) light source.

The reflective polarizing element may be a tilted dielectric film coated on a glass substrate, bulk optic or structured surface. The reflective polarizing element may also be a multilayered, birefringent polymeric film.

In a typical application, the polarized light source is used to illuminate an optical display, such as a Liquid Crystal Display (LCD). For this purpose, the polarized light source is used in combination with a means for delivering the polarized light to an optical display. This can include free space propagation, a lens system, or a polarization preserving light guide.

The polarized light source may also be used in various task lighting configurations such as vehicle dashboard displays, or fluorescent fixtures in an office lighting environment. For glare reduction, the polarized light source is placed to provide illumination to a specific task location where a manual or visual task is being performed.

BRIEF DESCRIPTION OF THE DRAWINGS

The various objects, features and advantages of the present polarized light source will be fully understood upon reading and understanding the following detailed description and accompanying drawings in which:

FIGS. 4A–4B show operation of the embodiments of FIGS. 3A and 3B, respectively,

FIG. 9 shows the present polarized light source in a configuration for a transflective optical display;

FIGS. 10A–10C show the present polarized light source in various task lighting configurations.

DETAILED DESCRIPTION

Figure 1:
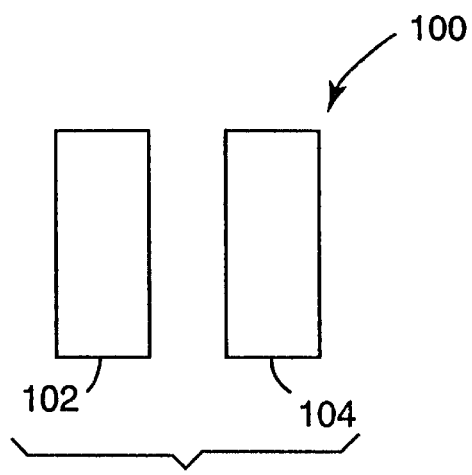
FIG. 1 is a simplified block diagram of the present polarized light source.

FIG. 1 shows a simplified block diagram of the present polarized light source 100. The source 100 includes a diffuse light source 102 and a reflective polarizing element 104 placed proximate thereto.

For purposes of the present application, "diffuse source" means any source which emits light having a high degree of scatter or randomization with respect to both polarization and direction. The diffuse source 102 preferably includes a light emitting region and a light reflecting, scattering and depolarizing region. Depending upon the particular application with which the present polarized light source is to be used, the diffuse source 102 may be a fluorescent lamp, incandescent lamp, solid-state source or electroluminescent (EL) light source. In a fluorescent lamp, such as a hot or cold cathode lamp as used in a typical backlit LCD, the phosphors provide all of these functions. In the case where a highly collimated beam of light is desired, the reflective polarizing element can be optically configured to image the rejected polarization back onto the light emitting region, for example, a filament or arc. The light emitting region will serve both as the light source and the depolarizing region.

The reflective polarizing element 104 may be a dielectric film coated on a glass substrate, bulk optic, or structured surface. Alternatively, the reflective polarizing element may be a multilayered, birefringent polymeric reflective polarizing film.

Figure 2:
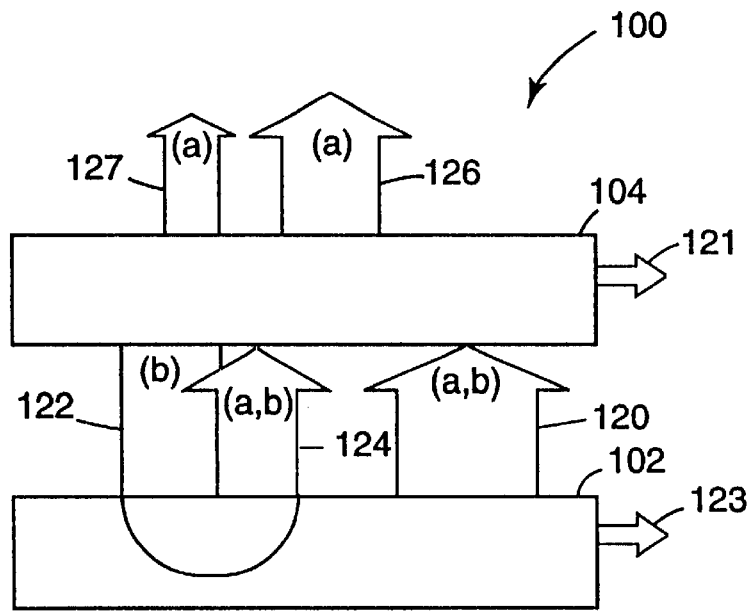
FIG. 2 is a schematic cross section of the present polarized light source showing the operation thereof.

FIG. 2 shows a simplified schematic cross section of the present polarized light source which illustrates the operation thereof. For simplicity of illustration, the diffuse source 102 and reflective polarizing element 104 are shown in a parallel geometry. However, it shall be understood that the same general optical principles apply to other geometries as well, particularly those geometries described below with respect to FIGS. 3A–3C and 5A–5E.

The light produced by the diffuse source 102 is illustrated by ray bundle 120. This light is randomly polarized and therefore has polarization components (a) and (b) present. This light is incident on the reflective polarizing element 104. The reflective polarizing element 104 is adapted to transmit light having a first polarization component (polarization component (a) in this example), and reflect light having the orthogonal polarization component ((b) in this example). Consequently, light of polarization component (a), depicted by ray bundle 126, is transmitted by the reflective polarizing element 104 while light of polarization component (b) is reflected, as indicated by ray bundle 122. For comparison purposes, ray bundle 126 also roughly corresponds to the amount of light transmitted if the reflective polarizing element 104 were replaced with an absorptive dichroic polarizer.

The reflective polarizing element 104 is preferably highly efficient and the total losses due to absorption within the reflective polarizing element 104 are very low (on the order of 1 percent). This lost light is depicted by ray bundle 121. The light of the rejected polarization is reflected, indicated by ray bundle 122, and reenters the diffuse source 102 where it reflects off of the phosphors. This causes some of the reflected light to be randomized and thus effectively converted to polarization component (a). Thus, as indicated by ray bundle 124, the reflected light emerges from the diffuse source 102 having both polarization components (a) and (b). The diffuse source 102 is not a perfect reflector and the light losses due to scattering and absorption are depicted by ray bundle 123. These losses are also low (on the order of 20 percent). The light of polarization component (a) in ray bundle 124 will be transmitted by reflective polarizing element 104, as indicated by ray bundle 127. The light in ray bundle 124 of polarization component (b) will again be reflected back into the source 102 and randomized in a similar fashion (this reflection not shown).

The result is a very efficient system for producing light of a desired polarization. The repeated reflections and randomizations effected by the combination of the diffuse source 102 and the reflective polarizing element 104 form an efficient mechanism for converting light from state (b) to state (a). The system is efficient in the sense that light which would otherwise have been absorbed, and therefore unavailable, is instead converted to the desired polarization. The present polarized light source thus makes much more efficient use of the light emitted from the source, since light of the rejected polarization is reflected back into the source and randomized. As a result, the total amount of light emitted from the source in the desired polarization is increased. The resulting amount of light of the desired polarization, depicted by ray bundles 126 and 127, may be 50–60 percent greater than the amount of light indicated by ray bundle 126, which would be produced if an absorptive dichroic polarizer were used instead of the reflective polarizing element 104.

The overall gain of the system depends on the efficiency of both the reflective polarizing element 104 and the diffuse source 102. Performance is maximized with a highly reflective and randomizing diffuse source 102, and a low loss, low absorbing reflective polarizing element 104.

Figure 3A:
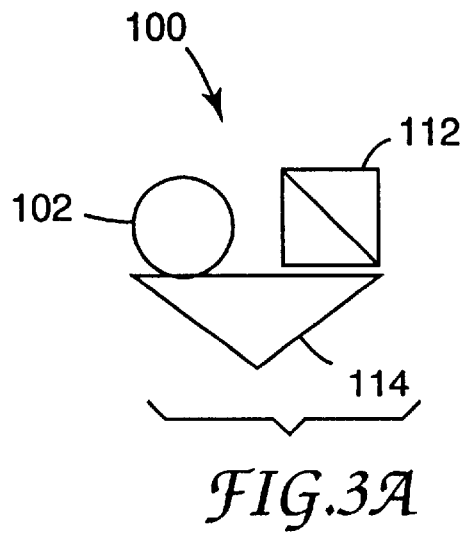
FIGS. 3A–3C are schematic cross sections of the present polarized light source in which the reflective polarizing element is implemented with bulk optic components.
Figure 3B:
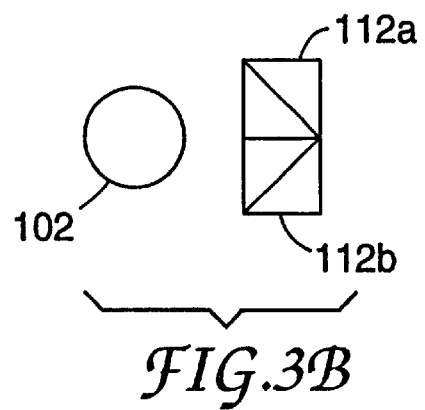
Figure 3C:
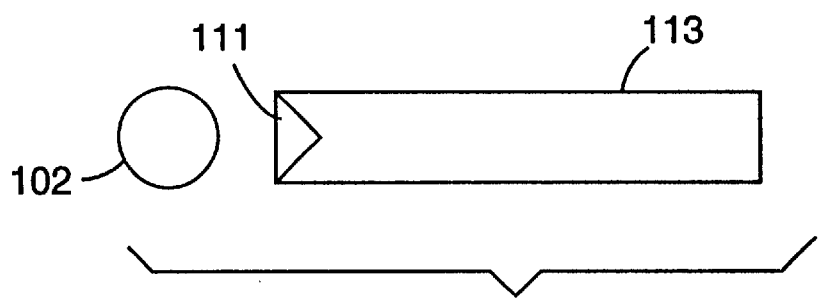

FIGS. 3A, 3B and 3C show embodiments of the present polarized light source 100 in which the reflective polarizing element is implemented using bulk optic components. In FIG. 3A, a diffuse source 102 is coupled with a reflective polarizing element including a polarizing beam splitter 112 and dielectric prism 114. In FIG. 3B, two polarizing beam splitters 112a and 112b form the reflective polarizing element. In FIG. 3C, a dielectric film is coated onto a notched edge 111 of a light guide 113.

Operation of the embodiment of FIG. 3A is shown in FIG. 4A. Diffuse source 102 produces light, represented by ray bundle 130, having both polarization components (a) and (b). Polarizing beam splitter 112 transmits light of polarization (a) (ray bundle 131) and reflects light of polarization (b) (ray bundle 132) into dielectric prism. 114. Dielectric prism 114 reflects the light back into diffuse source 102 where it is randomized (ray bundle 133) to include both polarizations (a) and (b). Of this, polarizing beam splitter 112 transmits light of polarization (a) (ray bundle 134) and again reflects light of polarization (b) (not shown). Thus, the light of incorrect polarization is recirculated to increase the amount of light produced in the desired polarization (ray bundles 131 and 134).

Operation of the embodiment of FIG. 3B is shown in FIG. 4B. Diffuse source 102 produces light, represented by ray bundle 135, having both polarization components (a) and (b). Polarizing beam splitter 112a transmits light of polarization (a) (ray bundle 136) and reflects light of polarization (b) (ray bundle 137) into polarizing beam splitter 112b. Polarizing beam splitter 112b reflects the light back into diffuse source 102 where it is randomized (ray bundle 138) to include both polarizations (a) and (b). Of this, polarizing beam splitter 112a transmits light of polarization (a) (ray bundle 139) and again reflects light of polarization (b) (not shown). Thus, the light of incorrect polarization is reflected and randomized to increase the amount of light produced in the desired polarization (ray bundles 136 and 139). Operation of the embodiment of FIG. 3C is similar to that of FIG. 3B.

The bulk optic reflective polarizing elements shown and described above with respect to FIGS. 3A–3C are efficient in the sense that they do not absorb a significant amount of light. However, they do suffer other disadvantages. For example, they are effective over only a narrow wavelength band and are thus not appropriate for applications requiring a broad spectral response. Also, the bulk optic components add bulk and weight to any system in which they are used and are therefore not appropriate for applications where light weight and small size are required. Finally, the bulk optic components are expensive and can substantially increase the cost of any system in which they are used.

Figure 5A:
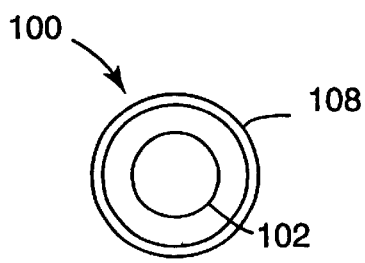
FIGS. 5A–5D are schematic cross sections of the present polarized light source in which the reflective polarizing element is implemented with a multilayer, birefringent reflective polarizing film.
Figure 5B:
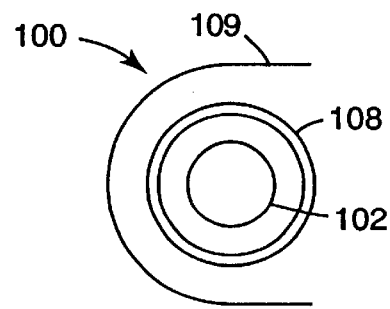
Figure 5C:
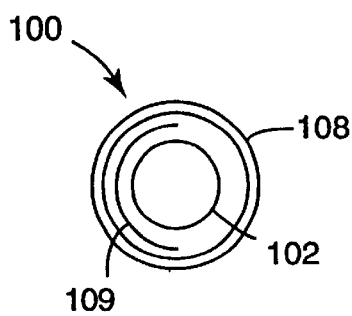
Figure 5D:
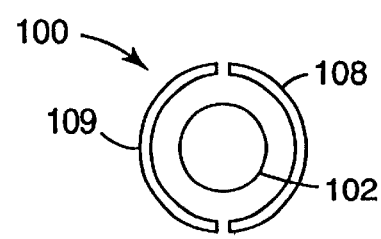

FIGS 5A–5D show embodiments of the present polarized light source 100 in which the reflective polarizing element is implemented using a multilayer reflective polarizing film (RPF) 108. In the most general configuration shown in FIG 5A, the RPF 108 is wrapped around such that it completely encloses the diffuse source 102. The embodiments of FIGS 5B–5D include a separate reflector in addition to the diffuse source 102 and RPF 108. The purpose of reflector 109 is to redirect light emitted from one side of the source towards the opposing side, providing even more polarized light in a given direction. In FIG. 5B, a reflector 109 (preferably a specular reflector) is oriented around one side of the polarized source 100. In FIG. 5C, a reflector 109 is located between the diffuse source 102 and the RPF 108. In this configuration, the reflector 109 may be laminated or otherwise attached to the RPF 108. FIG 5D shows a reflector 109 partially enclosing one side of the diffuse source 102 with the RPF 108 partially enclosing the other side of the diffuse source 102.

Figure 12:
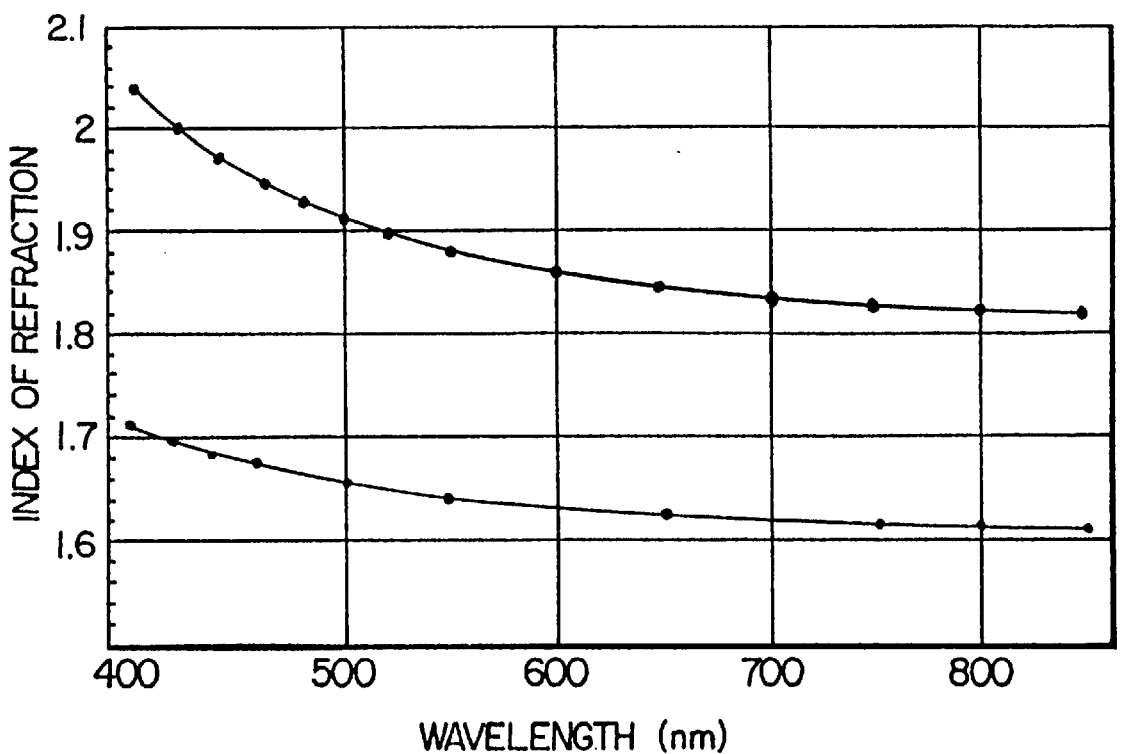
FIG. 12 is a graphical view illustrating the refractive indices characteristics of the PEN and coPEN layers of the present invention.

For the embodiments of FIGS. 5A–5D, the preferred reflective polarizing element 108 is a multilayered, birefringent reflective polarizing film (RPF) such as those described in commonly assigned U.S. patent application Ser. No. 08/402,041, filed Mar. 10, 1995, entitled "OPTICAL FILM", which is incorporated herein by reference. PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The differences in refractive indices associated with different in-plane axes exhibited by PEN and a 70-naphthalate/30-terephthalate copolyester (coPEN) for a 5:1 stretch ratio are illustrated in FIG. 12. In FIG. 12, the data on the lower curve represent the index of refraction of PEN in the transverse direction and the coPEN while the upper curve represents the index of refraction of PEN in the stretch direction. PEN exhibits a difference in refractive index of 0.25 to 0.40 in the visible spectrum. The birefringence (difference in refractive index) can be increased by increasing the molecular orientation. PEN is heat stable from about 155° C. up to about 230° C. depending upon shrinkage requirements of the application. Although PEN has been specifically discussed above as the preferred polymer for the birefringent layer, polybutylene naphthalate is also a suitable material as well as other crystalline naphthalene dicarboxylic polyesters. The crystalline naphthalene dicarboxylic polyester should exhibit a difference in refractive indices associated with different in-plane axes of at least 0.05 and preferably above 0.20.

Minor amounts of comonomers may be substituted into the naphthalene dicarboxylic acid polyester so long as the high refractive index in the stretch direction(s) is not substantially compromised. A drop in refractive index (and therefore decreased reflectivity) may be counter balanced by advantages in any of the following: adhesion to the selected polymer layer, lowered temperature of extrusion, better match of melt viscosities, better match of glass transition temperatures for stretching. Suitable monomers include those based on isophthalic, azelaic, adipic, sebacic, dibenzoic, terephthalic, 2,7-naphthalene icarboxylic, 2,6-naphthalene dicarboxylic or cyclohexanedicarboxylic acids.

The PEN/selected polymer resins of the present invention preferably have similar melt viscosities so as to obtain uniform multilayer coextrusion. The two polymers preferably have a melt viscosity within a factor of 5 at typical shear rates.

The PEN and the preferred selected polymer layers of the present invention exhibit good adhesion properties to each other while still remaining as discrete layers within the multilayered sheet.

The glass transition temperatures of the polymers of the present invention are compatible so adverse effects such as cracking of one set of polymer layers during stretching does not occur. By compatible is meant that the glass transition temperature of the selected polymer is lower than the glass transition temperature of the PEN layer. The glass transition temperature of the selected polymer layer temperature may be slightly higher than the glass transition temperature of the PEN layer, but by no more than 40° C.

Figure 13:
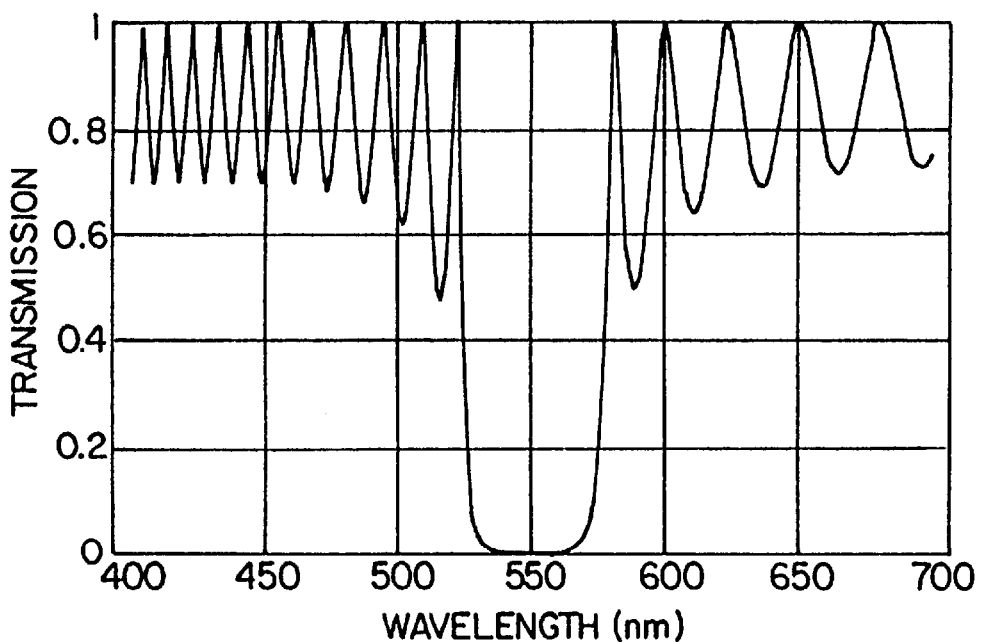
FIG. 13 is a graphical view of computer simulated data of percent transmission of a 50-layer Pen/coPEN film stack based on the indices shown in FIG. 12.
Figure 14:
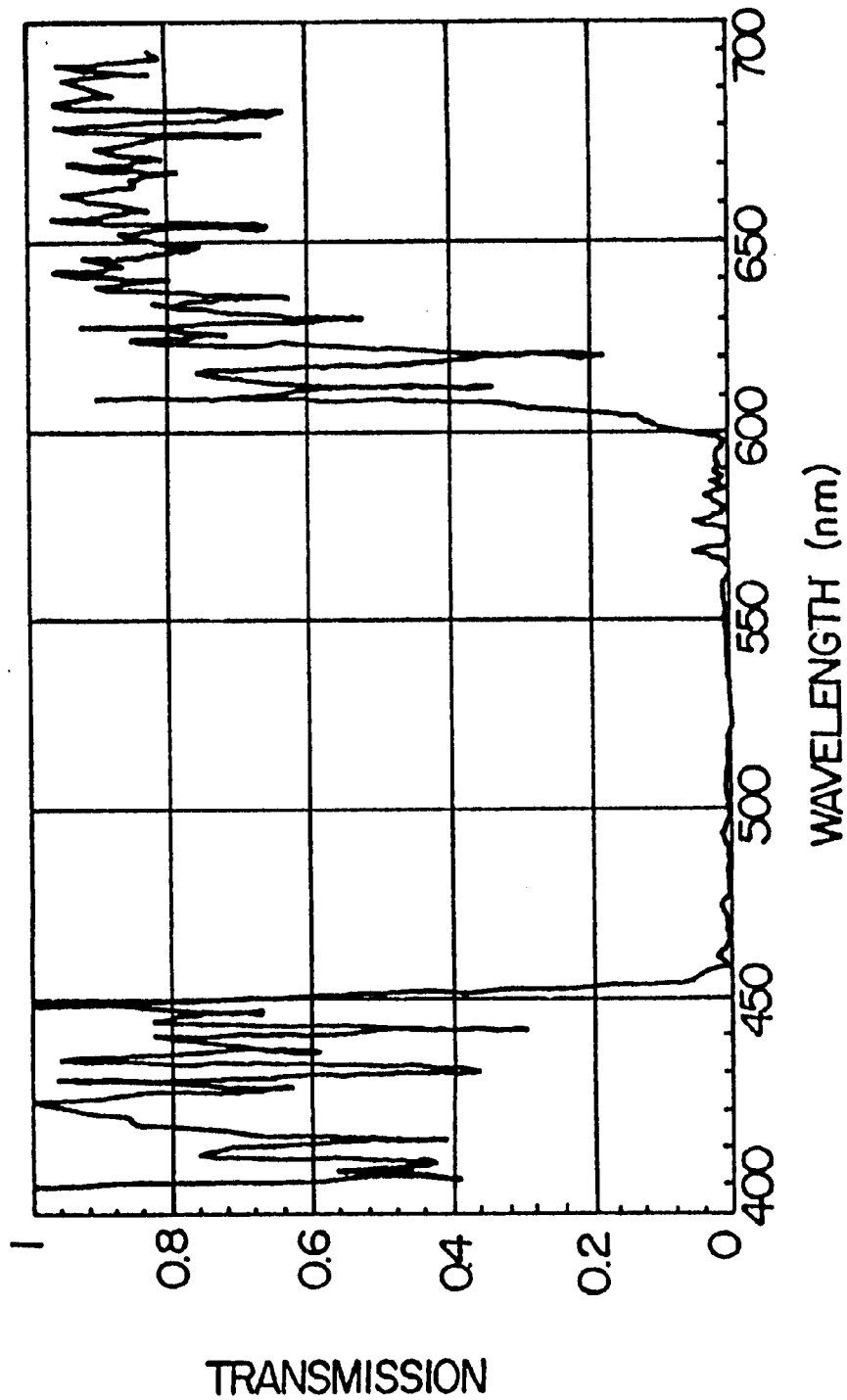
FIG. 14 is a graphical view of computer simulated data of percent transmission of an equally biaxially stretched 300-layer PEN/coPET mirror.
Figure 15:
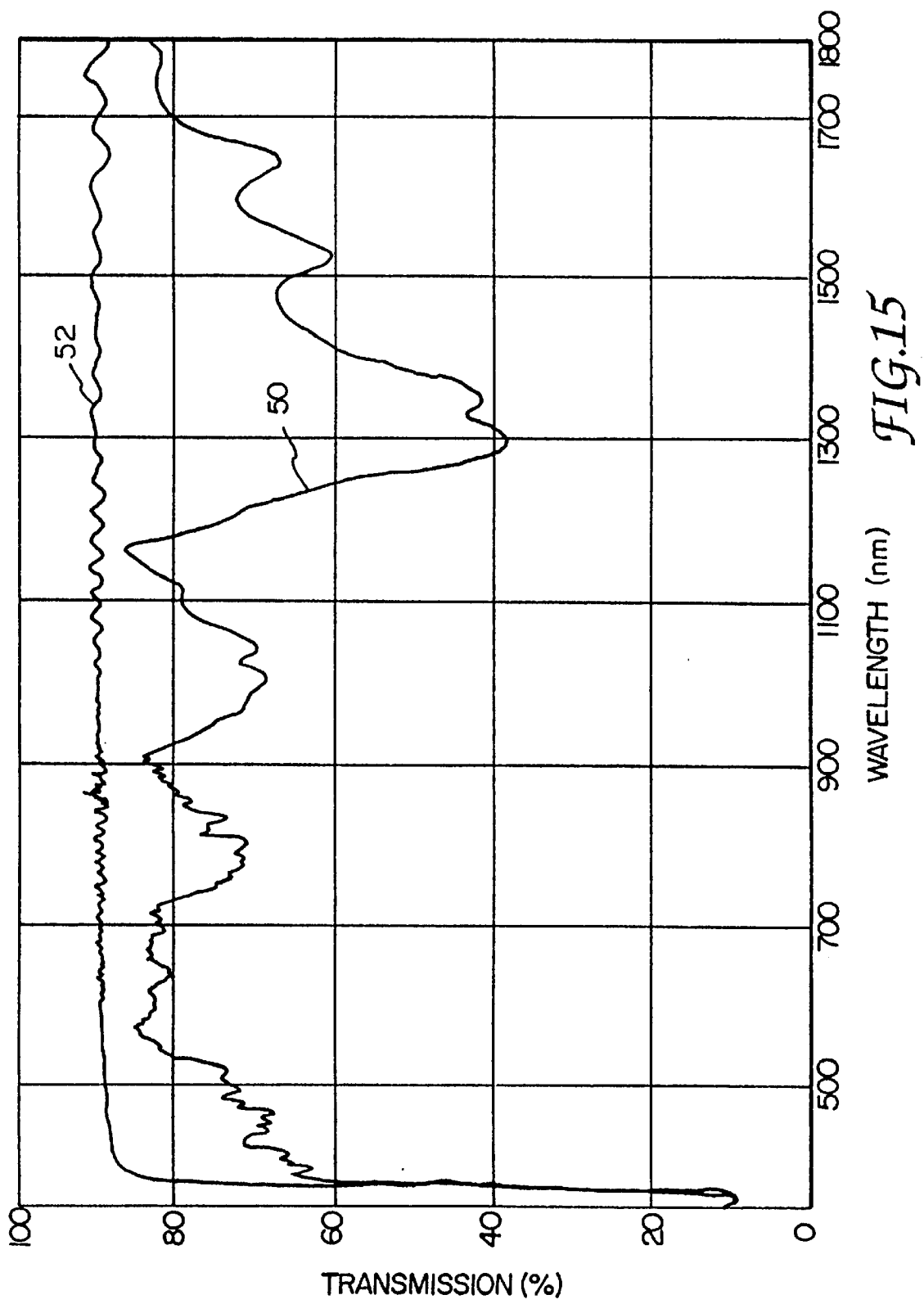
FIG. 15 is a graphical view of percent measured transmission of a 51-layer I.R. polarizer of he present invention with the first order peak near 1,300 nm.
Figure 16:
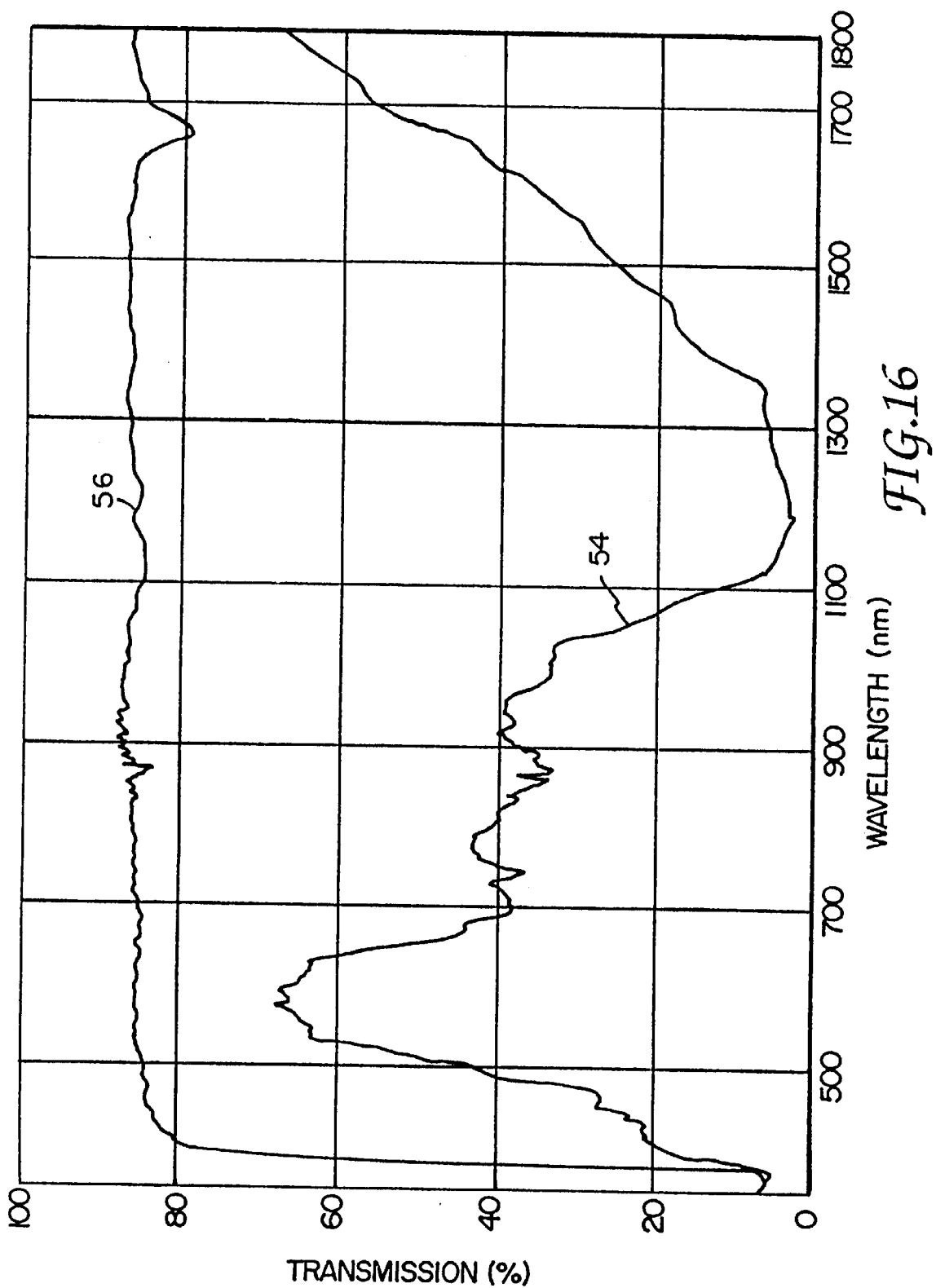
FIG. 16 is a graphical view of percent measured transmission of eight 51-layer polarizers of the present invention laminated together.
Figure 17:
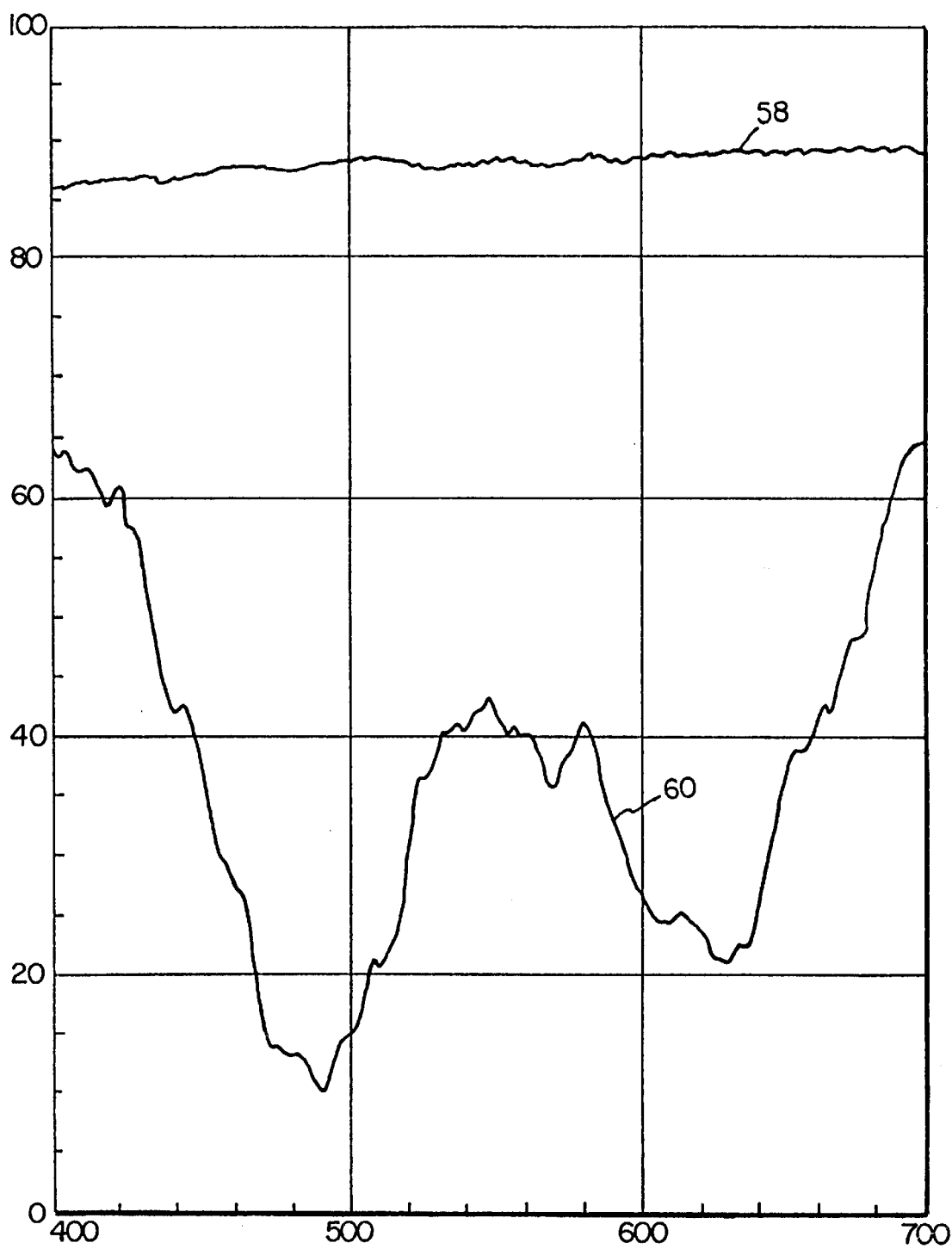
FIG. 17 is a graphical view of percent measured transmission of a 204-layer polarizer of the present invention.
Figure 18:
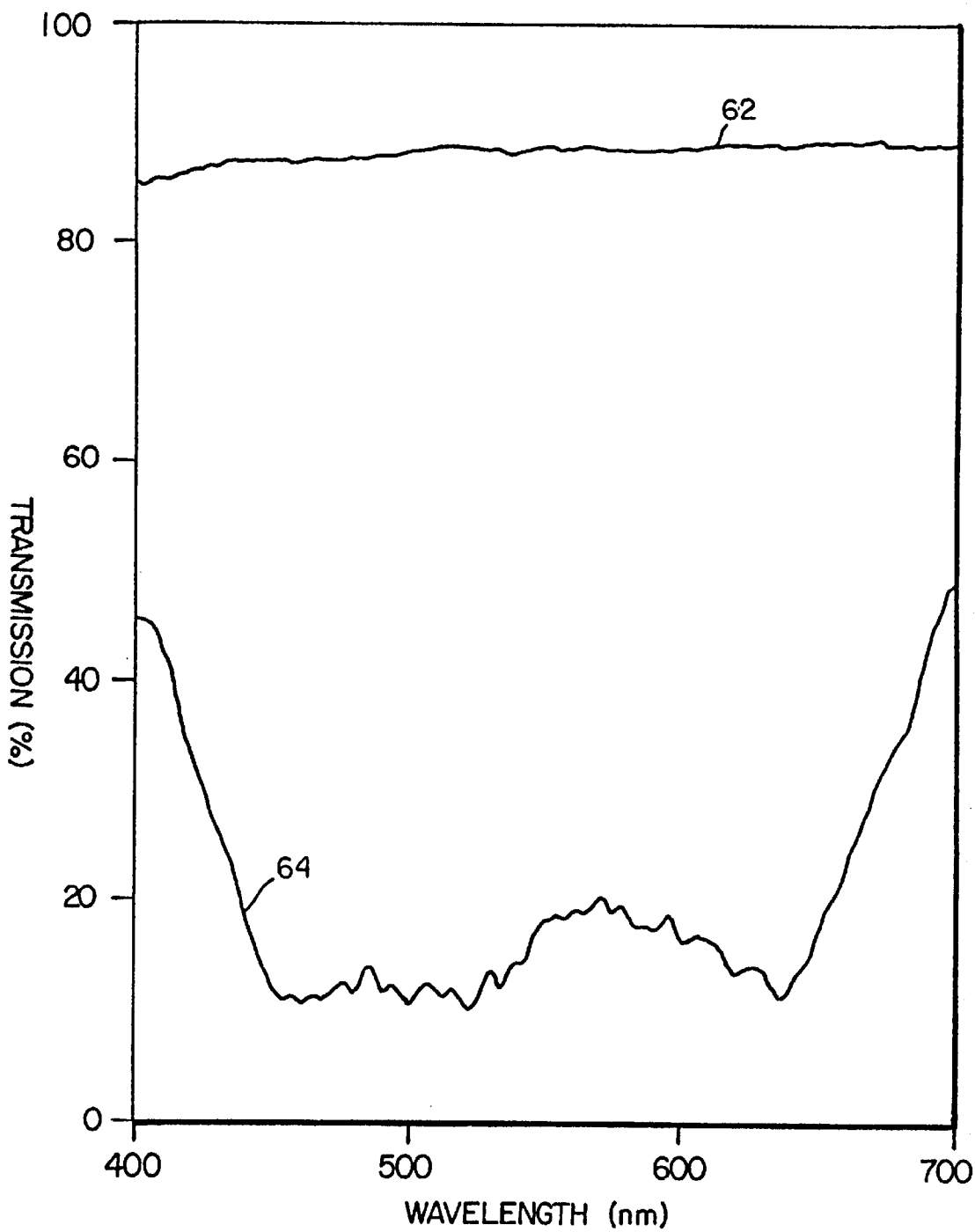
FIG. 18 is a graphical view of percent measured transmission of two 204-layer polarizers of the present invention laminated together.

Preferably, the layers have a ¼ wavelength thickness with different sets of layers designed to reflect different wavelength ranges. Each layer does not have to be exactly ¼ wavelength thick. The overriding requirement is that the adjacent low-high index film pair have a total optical thickness of 0.5 wavelength. The bandwidth of a 50-layer stack of PEN/coPEN layers having the index differential indicated in FIG. 12, with layer thicknesses chosen to be a ¼ wavelength of 550 nm, is about 50 nm. This 50-layer stack provides roughly a 99 percent average reflectivity in this wavelength range with no measurable absorption. A computer-modeled curve showing less than 1 percent transmission (99 percent reflectivity) is illustrated in FIG. 13. FIGS. 13–18 include data characterized as percent transmission. It should be understood that since there is no measurable absorbance by the film of the present invention that percent reflectivity is approximated by the following relationship:

100−(percent transmission)=(percent reflectivity).

Figure 29A:
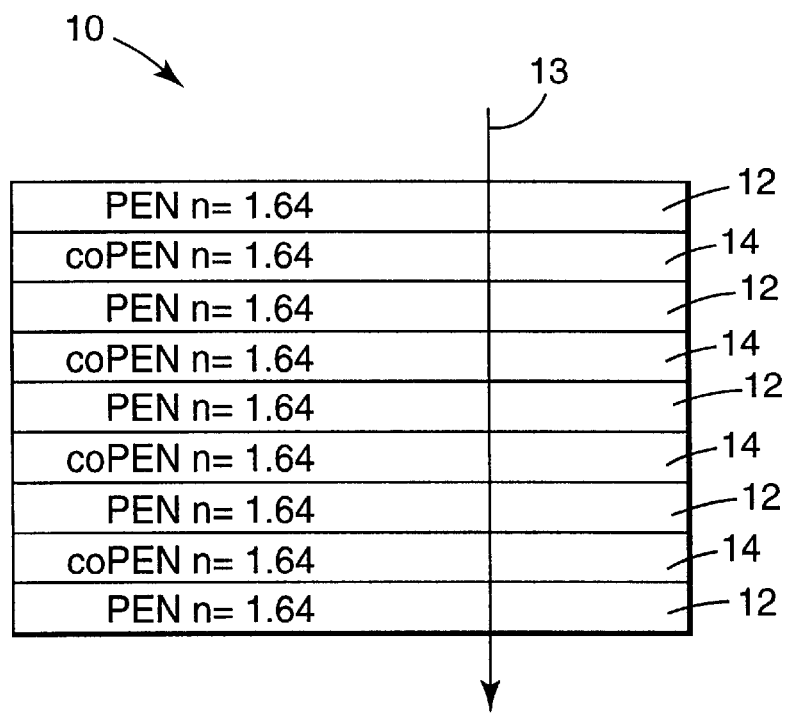
FIGS. 29a and 29b are diagrammatical views of the polarizer of the present invention.
Figure 29B:
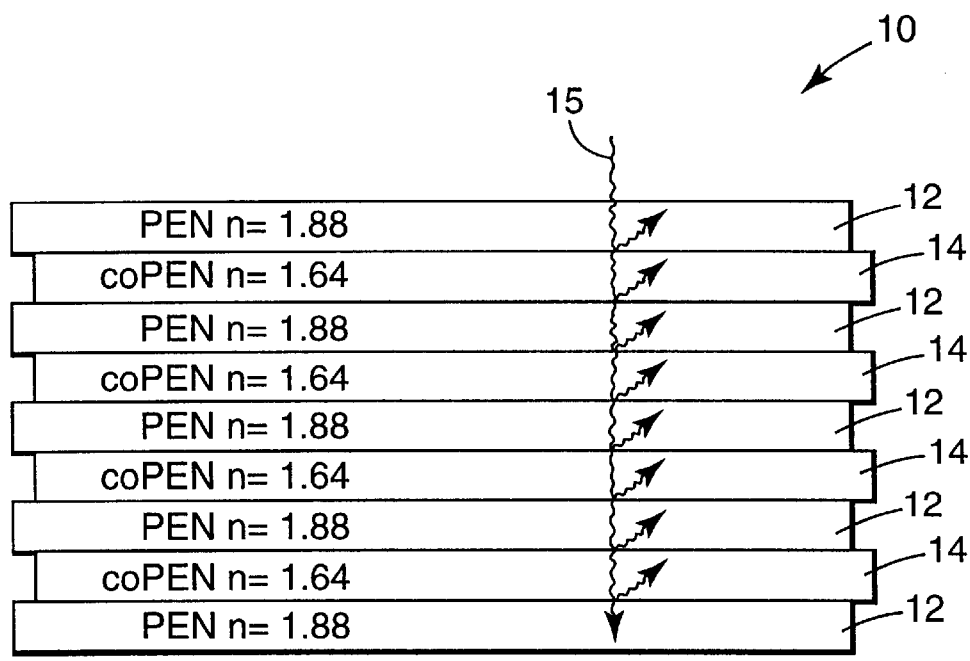

The preferred selected polymer layer 14 remains isotropic in refractive index and substantially matches the refractive index of the PEN layer 12 associated with the transverse axis as illustrated in FIG. 29a. Light 13 with its plane of polarization in this direction will be predominantly transmitted by the polarizer while light 15 with its plane of polarization in the oriented direction will be reflected as illustrated in FIG. 29b.

Orientation of the extruded film was done by stretching individual sheets of the material in heated air. For economical production, stretching may be accomplished on a continuous basis in a standard length orienter, tenter oven, or both. Economies of scale and line speeds of standard polymer film production may be achieved thereby achieving manufacturing costs that are substantially lower than costs associated with commercially available absorptive polarizers.

Lamination of two or more sheets together is advantageous, to improve reflectivity or to broaden the bandwidth, or to form a mirror from two polarizers. Amorphous copolyesters are useful as laminating materials, with VITEL Brand 3000 and 3300 from the Goodyear Tire and Rubber Co. of Akron, Ohio, noted as materials that have been tried. The choice of laminating material is broad, with adhesion to the sheets 10, optical clarity and exclusion of air being the primary guiding principles.

It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the performance of the present invention.

The optical behavior of a multilayer stack 10 such as that shown in FIGS. 29a and 29b will now be described in more general terms.

The optical properties and design considerations of multilayer stacks described below allow the construction of multilayer stacks for which the Brewster angle (the angle at which reflectance goes to zero) is very large or is nonexistent. This allows for the construction of multilayer mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

The average transmission at normal incidence for a multilayer stack, (for light polarized in the plane of the extinction axis in the case of polarizers, or for both polarizations in the case of mirrors), is desirably less than 50% (reflectivity of 0.5) over the intended bandwidth. (It shall be understood that for the purposes of the present application, all transmission or reflection values given include front and back surface reflections). Other multilayer stacks exhibit lower average transmission and/or a larger intended bandwidth, and/or over a larger range of angles from the normal. If the intended bandwidth is to be centered around one color only, such as red, green or blue, each of which has an effective bandwidth of about 100 nm each, a multilayer stack with an average transmission of less than 50% is desirable. A multilayer stack having an average transmission of less than 10% over a bandwidth of 100 nm is also preferred. Other exemplary preferred multilayer stacks have an average transmission of less than 30% over a bandwidth of 200 nm. Yet another preferred multilayer stack exhibits an average transmission of less than 10% over the bandwidth of the visible spectrum (400–700 nm). Most preferred is a multilayer stack that exhibits an average transmission of less than 10% over a bandwidth of 380 to 740 nm. The extended bandwidth is useful even in visible light applications in order to accommodate spectral shifts with angle, and variations in the multilayer stack and overall film caliper.

The multilayer stack 10 can include tens, hundreds or thousands of layers, and each layer can be made from any of a number of different materials. The characteristics which determine the choice of materials for a particular stack depend upon the desired optical performance of the stack.

The stack can contain as many materials as there are layers in the stack. For ease of manufacture, preferred optical thin film stacks contain only a few different materials. For purposes of illustration, the present discussion will describe multilayer stacks including two materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Several parameters may affect the maximum reflectivity achievable in any multilayer stack. These include basic stack design, optical absorption, layer thickness control and the relationship between indices of refraction of the layers in the stack. For high reflectivity and/or sharp bandedges, the basic stack design should incorporate optical interference effects using standard thin film optics design. This typically involves using optically thin layers, meaning layers having an optical thickness in the range of 0.1 to 1.0 times the wavelength of interest. The basic building blocks for high reflectivity multilayer films are low/high index pairs of film layers, wherein each low/high index pair of layers has a combined optical thickness of ½ the center wavelength of the band it is designed to reflect. Stacks of such films are commonly referred to as quarterwave stacks.

To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to tune the multilayer stack such that the "blue" layers are on the incident side. of the multilayer stack.

A multilayer construction of alternative low and high index thick films, often referred to as a "pile of plates", has no tuned wavelengths nor bandwidth constraints, and no wavelength is selectively reflected at any particular layer in the stack. With such a construction, the blue reflectivity suffers due to higher penetration into the stack, resulting in higher absorption than for the preferred quarterwave stack design. Arbitrarily increasing the number of layers in a "pile of plates" will not always give high reflectivity, even with zero absorption. Also, arbitrarily increasing the number of layers in any stack may not give the desired reflectivity, due to the increased absorption which would occur.

The relationships between the indices of refraction in each film layer to each other and to those of the other layers in the film stack determine the reflectance behavior of the multilayer stack at any angle of incidence, from any azimuthal direction. Assuming that all layers of the same material have the same indices, then a single interface of a two component quarterwave stack can be analyzed to understand the behavior of the entire stack as a function of angle.

For simplicity of discussion, therefore, the optical behavior of a single interface will be described. It shall be understood, however, that an actual multilayer stack according to the principles described herein could be made of tens, hundreds or thousands of layers. To describe the optical behavior of a single interface, such as the one shown in FIG. 30, the reflectivity as a function of angle of incidence for s and p polarized light for a plane of incidence including the z-axis and one in-plane optic axis will be plotted.

Figure 30:
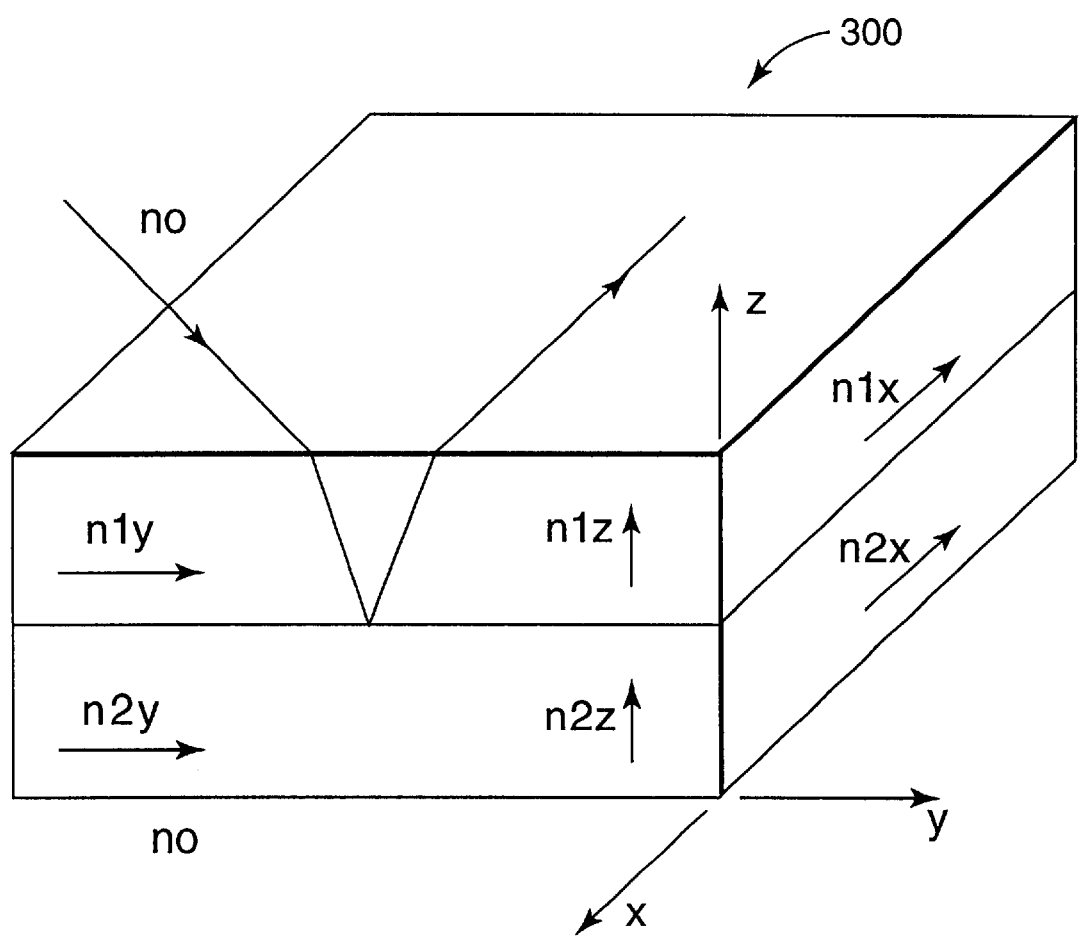
FIG. 30 shows a two layer stack of films forming a single interface.

FIG. 30 shows two material film layers forming a single interface, with both immersed in an isotropic medium of index no. For simplicity of illustration, the present discussion will be directed toward an orthogonal multilayer birefringent system with the optical axes of the two materials aligned, and with one optic axis (z) perpendicular to the film plane, and the other optic axes along the x and y axis. It shall be understood, however, that the optic axes need not be orthogonal, and that nonorthogonal systems are well within the spirit and scope of the present invention. It shall be further understood that the optic axes also need not be aligned with the film axes to fall within the intended scope of the present invention.

The reflectivity of a dielectric interface varies as a function of angle of incidence, and for isotropic materials, is different for p and s polarized light. The reflectivity minimum for p polarized light is due to the so called Brewster effect, and the angle at which the reflectance goes to zero is referred to as Brewster's angle.

The reflectance behavior of any film stack, at any angle of incidence, is determined by the dielectric tensors of all films involved. A general theoretical treatment of this topic is given in the text by R. M. A. Azzam and N. M. Bashara, "Ellipsometry and Polarized Light", published by North-Holland, 1987.

The reflectivity for a single interface of a system is calculated by squaring the absolute value of the reflection coefficients for p and s polarized light, given by equations 1 and 2, respectively. Equations 1 and 2 are valid for uniaxial orthogonal systems, with the axes of the two components aligned.

$$r_{pp} = \frac{n2z * n2o\sqrt{(n1z2 - no\sin2\theta)} - n1z * n1o\sqrt{(n2z2 - no\sin2\theta)}}{n2z * n2o\sqrt{(n1z2 - no\sin2\theta)} + n1z * n1o\sqrt{(n2z2 - no\sin2\theta)}} \quad 1)$$

$$r_{ss} = \frac{\sqrt{(n1o2 - no\sin2\theta)} - \sqrt{(n2o2 - no\sin2\theta)}}{\sqrt{(n1o2 - no\sin2\theta)} + \sqrt{(n2o2 - no\sin2\theta)}} \quad 2)$$

where θ is measured in the isotropic medium.

In a uniaxial birefringent system, n1x=n1y=n1o, and n2x=n2y=n2o.

For a biaxial birefringent system, equations 1 and 2 are valid only for light with its plane of polarization parallel to the x-z or y-z planes, as defined in FIG. 30. So, for a biaxial system, for light incident in the x-z plane, n1o=n1x and n2o=n2x in equation 1 (for p-polarized light), and n1o=n1y and n2o=n2y in equation 2 (for s-polarized light). For light incident in the y-z plane, n1o=n1y and n2o=n2y in equation I (for p-polarized light), and n1o=n1x and n2o=n2x in equation 2 (for s-polarized light).

Equations 1 and 2 show that reflectivity depends upon the indices of refraction in the x, y (in-plane) and z directions of each material in the stack. In an isotropic material, all three indices are equal, thus nx=ny=nz. The relationship between nx, ny and nz determine the optical characteristics of the material. Different relationships between the three indices lead to three general categories of materials: isotropic, uniaxially birefringent, and biaxially birefringent. Equations 1 and 2 describe biaxially birefringent cases only along the x or y axis, and then only if considered separately for the x and y directions.

A uniaxially birefringent material is defined as one in which the index of refraction in one direction is different from the indices in the other two directions. For purposes of the present discussion, the convention for describing uniaxially birefringent systems is for the condition nx=ny≠nz. The x and y axes are defined as the in-plane axes and the respective indices, nx and ny, will be referred to as the in-plane indices.

One method of creating a uniaxial birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization.

A uniaxial birefringent material can have either positive or negative uniaxial birefringence. Positive uniaxial birefringence occurs when the z-index is greater than the in-plane indices (nz>nx and ny). Negative uniaxial birefringence occurs when the z-index is less than the in-plane indices (nz<nx and ny).

A biaxial birefringent material is defined as one in which the indices of refraction in all three axes are different, e.g., nx≠ny≠nz. Again, the nx and ny indices will be referred to as the in-plane indices. A biaxial birefringent system can be made by stretching the multilayer stack in one direction. In other words the stack is uniaxially stretched. For purposes of the present discussion, the x direction will be referred to as the stretch direction for biaxial birefringent stacks.

To make a mirror, two uniaxially stretched polarizing sheets 10 are positioned with their respective orientation axes rotated 90°, or the sheet 10 is biaxially stretched. In the latter case, both PEN refractive indices in the plane of the sheet increase and the selected polymer should be chosen with as low of a refractive index as possible to reflect light of both planes of polarization. Biaxially stretching the multilayered sheet will result in differences between refractive indices of adjoining layers for planes parallel to both axes thereby resulting in reflection of light in both planes of polarization directions. Biaxially stretching PEN will increase the refractive indices associated with those axes of elongation from 1.64 to only 1.75, compared to the uniaxial value of 1.9. Therefore to create a dielectric mirror with 99 percent reflectivity (and thus with no noticeable iridescence) a low refractive index coPET is preferred as the selected polymer. Optical modeling indicates this is possible with an index of about 1.55. A 300-layer film with a 5 percent standard deviation in layer thickness, designed to cover half of the visible spectrum with six overlapping quarterwave stacks, has the predicted performance shown in FIG. 14. A greater degree of symmetry of stretching yields an article that exhibits relatively more symmetric reflective properties and relatively less polarizing properties.

If desired, two or more sheets of the invention may be used in a composite to increase reflectivity, optical band width, or both. If the optical thicknesses of pairs of layers within the sheets are substantially equal, the composite will reflect, at somewhat greater efficiency, substantially the same band width and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is useful for increasing total reflectance while still polarizing transmitted light. Alternatively, a single sheet may be asymmetrically biaxially stretched to produce a film having selective reflective and polarizing properties.

The preferred selected polymer for use in a biaxially stretched mirror application is based on terephthalic, isophthalic, sebacic, azelaic or cyclohexanedicarboxylic acid to attain the lowest possible refractive index while still maintaining adhesion to the PEN layers. Naphthalene dicarboxylic acid may still be employed in minor amounts to improve the adhesion to PEN. The diol component may be taken from any that have been previously mentioned. Preferably the selected polymer has an index of refraction of less than 1.65 and more preferably an index of refraction of less than 1.55.

It is not required that the selected polymer be a copolyester or copolycarbonate. Vinyl polymers and copolymers made from monomers such as vinyl naphthalenes, styrenes, ethylene, maleic anhydride, acrylates, methacrylates, might be employed. Condensation polymers other than polyesters and polycarbonates might also be useful, examples include: polysulfones, polyamides, polyurethanes, polyamic acids, polyimides. Naphthalene groups and halogens such as chlorine, bromine and iodine are useful in increasing the refractive index of the selected polymer to the desired level (1.59 to 1.69) to substantially match the refractive index of PEN associated with the transverse direction for a polarizer. Acrylate groups and fluorine are particularly useful in decreasing refractive index for use in a mirror.

The optical properties and design considerations of uniaxial birefringent systems will now be discussed. As discussed above, the general conditions for a uniaxial birefringent material are nx=ny≠nz. Thus if each layer 102 and 104 in FIG. 30 is uniaxially birefringent, n1x=n1y and n2x=n2y. For purposes of the present discussion, assume that layer 102 has larger in-plane indices than layer 104, and that thus n1>n2 in both the x and y directions. The optical behavior of a uniaxial birefringent multilayer system can be adjusted by varying the values of n1z and n2z to introduce different levels of positive or negative birefringence. The relationship between the various indices of refraction can be measured directly, or, the general relationship may be indirectly observed by analysis of the spectra of the resulting film as described herein.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10% to 50%, and can cover a bandwidth of anywhere between, for example, 100 nm and 450 nm, depending upon the particular application. For a high efficiency mirror, average transmission along each stretch direction at normal incidence over the visible spectrum (400–700 nm) is desirably less than 10%, preferably less than 5%, more preferably less than 2%, and even more preferably less than 1%. In addition, asymmetric mirrors may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Equation 1 described above can be used to determine the reflectivity of a single interface in a uniaxial birefringent system composed of two layers such as that shown in FIG. 30. Equation 2, for s polarized light, is identical to that of the case of isotropic films (nx=ny=nz), so only equation 1 need be examined. For purposes of illustration, some specific, although generic, values for the film indices will be assigned. Let n1x=n1y=1.75, n1z=variable, n2x=n2y=1.50, and n2z=variable. In order to illustrate various possible Brewster angles in this system, no=1.60 for the surrounding isotropic media.

Figure 19:
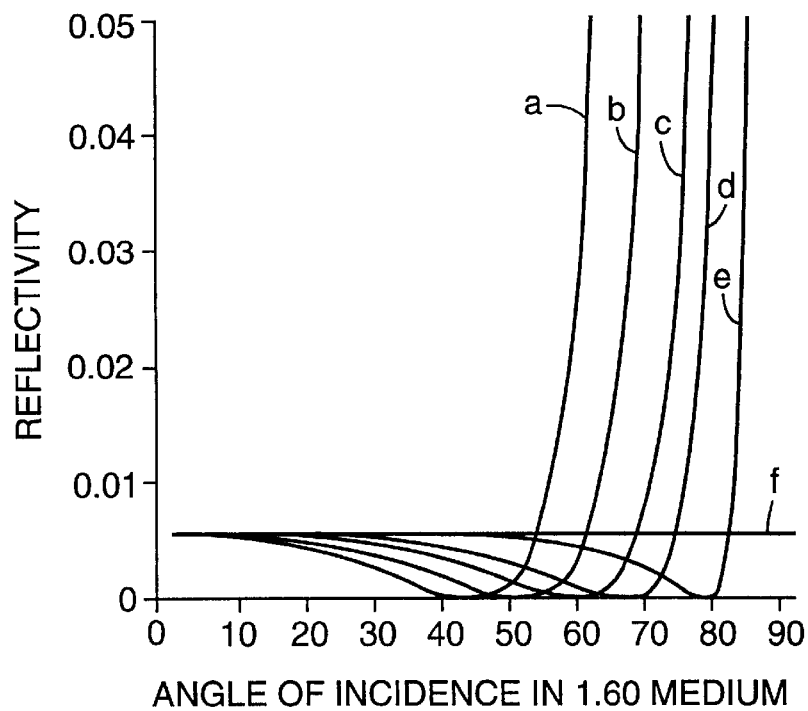
FIGS. 19 and 20 show reflectivity versus angle curves for a uniaxial birefringent system in a medium of index 1.60.

FIG. 19 shows reflectivity versus angle curves for p-polarized light incident from the isotropic medium to the birefringent layers, for cases where n1z is numerically greater than or equal to n2z (n1z≧n2z). The curves shown in FIG. 19 are for the following z-index values: a) n1z=1.75, n2z=1.50; b) n1z=1.75, n2z=1.57; c) n1z=1.70, n2z=1.60; d) n1z=1.65, n2z=1.60; e) n1z=1.61, n2z=1.60; and f) n1z=1.60=n2z. As n1z approaches n2z, the Brewster angle, the angle at which reflectivity goes to zero, increases. Curves a–e are strongly angular dependent. However, when n1z=n2z (curve f), there is no angular dependence to reflectivity. In other words, the reflectivity for curve f is constant for all angles of incidence. At that point, equation 1 reduces to the angular independent form: (n2o−n1o)/(n2o+n1o). When n1z=n2z, there is no Brewster effect and there is constant reflectivity for all angles of incidence.

Figure 20:
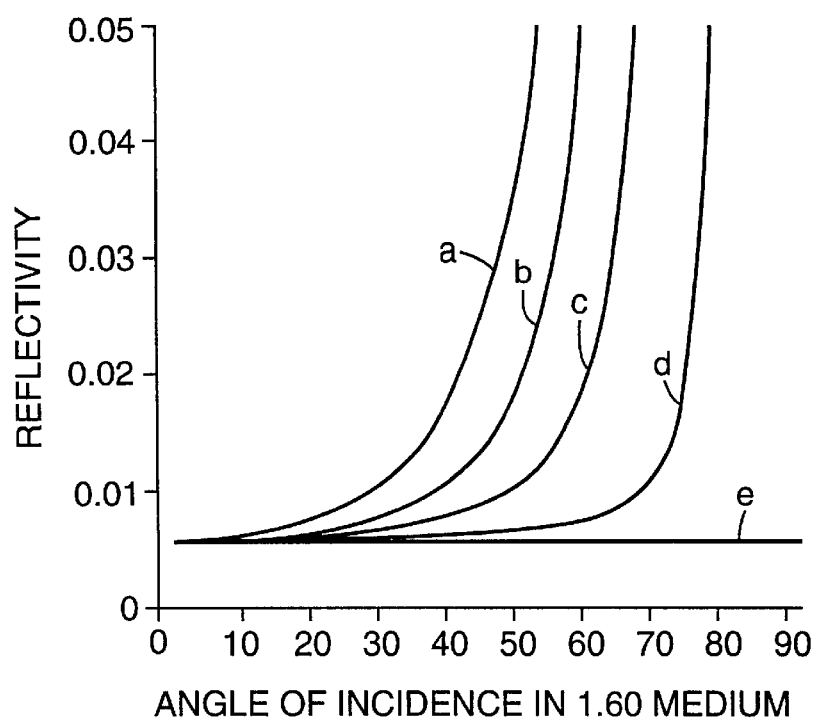

FIG. 20 shows reflectivity versus angle of incidence curves for cases where n1z is numerically less than or equal to n2z. Light is incident from isotropic medium to the birefringent layers. For these cases, the reflectivity monotonically increases with angle of incidence. This is the behavior that would be observed for s-polarized light. Curve a in FIG. 20 shows the single case for s polarized light. Curves b–e show cases for p polarized light for various values of nz, in the following order: b) n1z=1.50, n2z=1.60; c) n1z=1.55, n2z=1.60; d) n1z=1.59, n2z=1.60; and e) n1z=1.60=n2z. Again, when n1z=n2z (curve there is no Brewster effect, and there is constant reflectivity for all angles of incidence.

Figure 21:
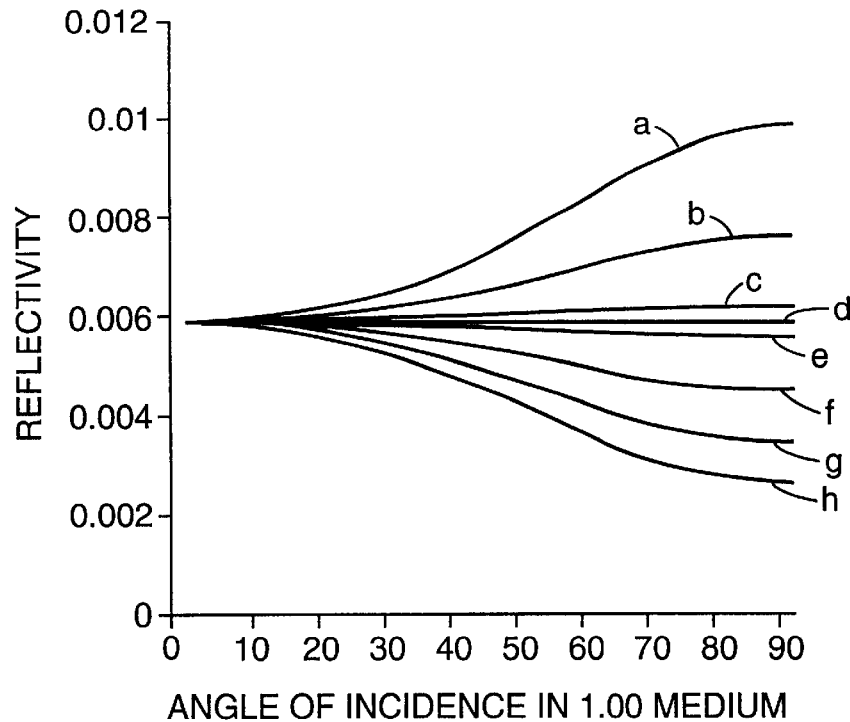
FIG. 21 shows reflectivity versus angle curves for a uniaxial birefringent system in a medium of index 1.0

FIG. 21 shows the same cases as FIGS. 19 and 20 but for an incident medium of index no=1.0 (air). The curves in FIG. 21 are plotted for p polarized light at a single interface of a positive uniaxial material of indices n2x=n2y=1.50, n2z=1.60, and a negative uniaxially birefringent material with n1x=n1y=1.75, and values of n1z, in the following order, from top to bottom, of: a) 1.50; b) 1.55; c) 1.59; d) 1.60; f) 1.61; g) 1.65; h) 1.70; and i) 1.75. Again, as was shown in FIGS. 19 and 20, when the values of n1z and n2z match (curve d), there is no angular dependence to reflectivity.

FIGS. 19, 20 and 21 show that the cross-over from one type of behavior to another occurs when the z-axis index of one film equals the z-axis index of the other film. This is true for several combinations of negative and positive uniaxially birefringent, and isotropic materials. Other situations occur in which the Brewster angle is shifted to larger or smaller angles.

Figure 22:
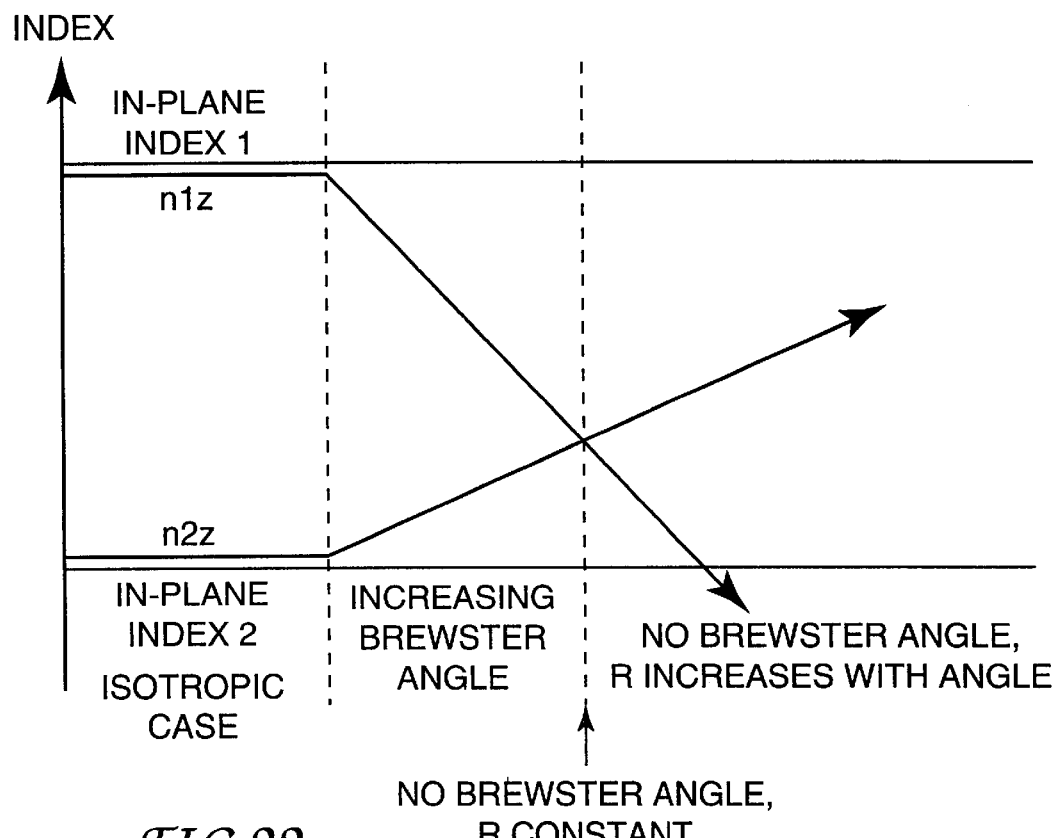
FIGS. 22, 23 and 24 show various relationships between in-plane indices and z-index for a uniaxial birefringent system.
Figure 23:
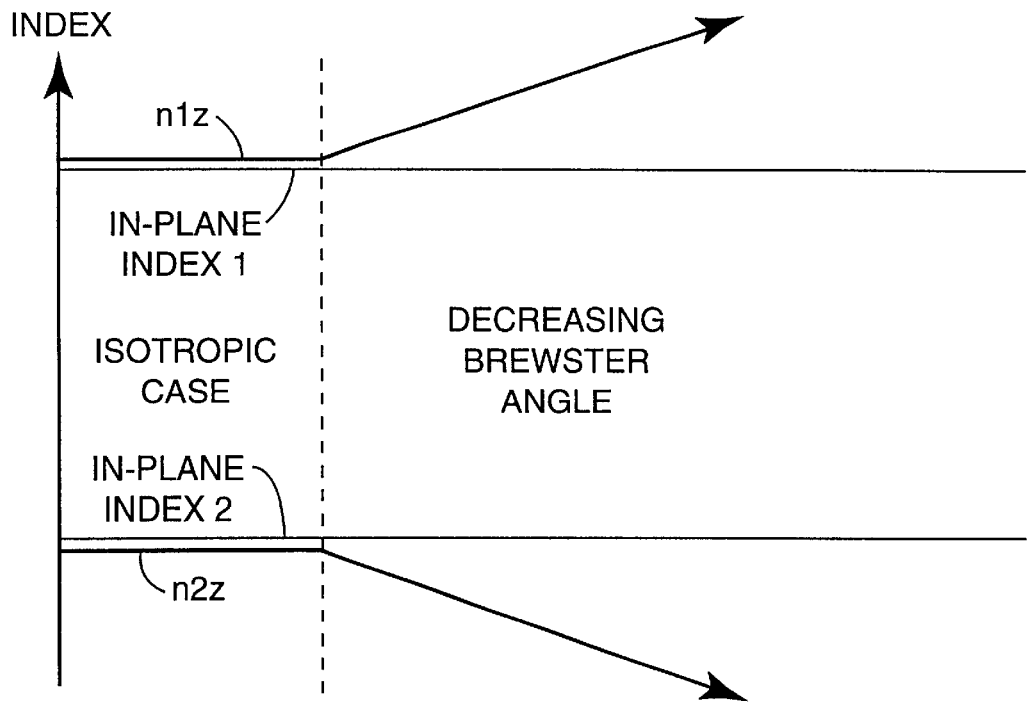
Figure 24:
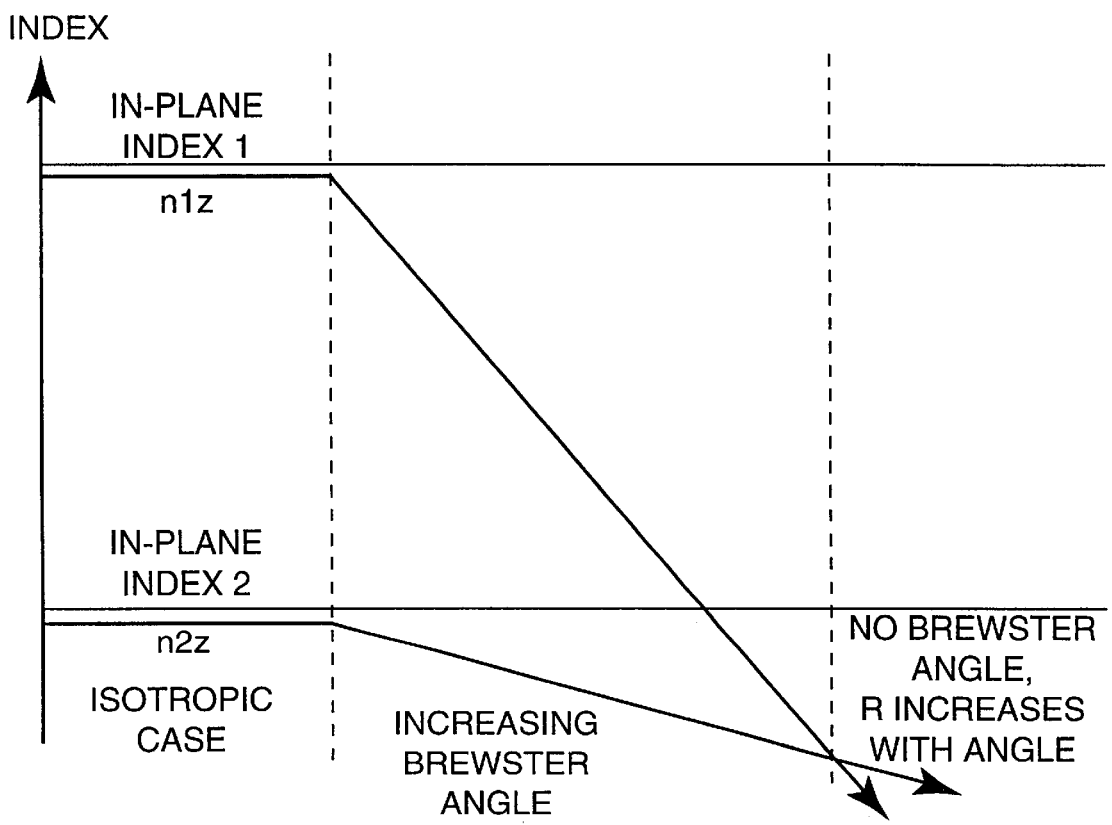

Various possible relationships between in-plane indices and z-axis indices are illustrated in FIGS. 22, 23 and 24. The vertical axes indicate relative values of indices and the horizontal axes are used to separate the various conditions. Each figure begins at the left with two isotropic films, where the z-index equals the in-plane indices. As one proceeds to the right, the in-plane indices are held constant and the various z-axis indices increase or decrease, indicating the relative amount of positive or negative birefringence.

The case described above with respect to FIGS. 19, 20 and 21 is illustrated in FIG. 22. The in-plane indices of material one are greater than the in-plane indices of material two, material 1 has negative birefringence (n1z less than in-plane indices), and material two has positive birefringence (n2z greater than in-plane indices). The point at which the Brewster angle disappears and reflectivity is constant for all angles of incidence is where the two z-axis indices are equal. This point corresponds to curve f in FIG. 19, curve e in FIG. 20 or curve d in FIG. 21.

In FIG. 23, material one has higher in-plane indices than material two, but material one has positive birefringence and material two has negative birefringence. In this case, the Brewster minimum can only shift to lower values of angle.

Both FIGS. 22 and 23 are valid for the limiting cases where one of the two films is isotropic. The two cases are where material one is isotropic and material two has positive birefringence, or material two is isotropic and material one has negative birefringence. The point at which there is no Brewster effect is where the z-axis index of the birefringent material equals the index of the isotropic film.

Another case is where both films are of the same type, i.e., both negative or both positive birefringent. FIG. 24 shows the case where both films have negative birefringence. However, it shall be understood that the case of two positive birefringent layers is analogous to the case of two negative birefringent layers shown in FIG. 24. As before, the Brewster minimum is eliminated only if one z-axis index equals or crosses that of the other film.

Yet another case occurs where the in-plane indices of the two materials are equal, but the z-axis indices differ. In this case, which is a subset of all three cases shown in FIGS. 22–24, no reflection occurs for s polarized light at any angle, and the reflectivity for p polarized light increases monotonically with increasing angle of incidence. This type of article has increasing reflectivity for p-polarized light as angle of incidence increases, and is transparent to s-polarized light. This article can be referred to as a "p-polarizer".

The above described principles and design considerations describing the behavior of uniaxially birefringent systems can be applied to create multilayer stacks having the desired optical effects for a wide variety of circumstances and applications. The indices of refraction of the layers in the multilayer stack can be manipulated and tailored to produce devices having the desired optical properties. Many negative and positive uniaxial birefringent systems can be created with a variety of in-plane and z-axis indices, and many useful devices can be designed and fabricated using the principles described here.

The reflective polarizer of the present invention is useful in optical elements such as ophthalmic lenses, mirrors and windows. The polarizer is characterized by a mirror-like look which is considered stylish in sunglasses. In addition, PEN is a very good ultraviolet filter, absorbing ultraviolet efficiently up to the edge of the visible spectrum. The reflective polarizer of the present invention would also be useful as a thin infrared sheet polarizer.

For the polarizer, the sheet is preferably oriented by stretching in a single direction and the index of refraction of the PEN layer exhibits a large difference between incident light rays with the plane of polarization parallel to the oriented and transverse directions. The index of refraction associated with an in-plane axis (an axis parallel to the surface of the film) is the effective index of refraction for plane-polarized incident light whose plane of polarization is parallel to that axis. By oriented direction is meant the direction in which the film is stretched. By transverse direction is meant that direction orthogonal in the plane of the film to the direction in which the film is oriented.

For the polarizer, the PEN/selected polymer layers have at least one axis for which the associated indices of refraction are preferably substantially equal. The match of refractive indices associated with that axis, which typically is the transverse axis, results in substantially no reflection of light in that plane of polarization. The selected polymer layer may also exhibit a decrease in the refractive index associated with the stretch direction. A negative birefringence of the selected polymer has the advantage of increasing the difference between indices of refraction of adjoining layers associated with the orientation axis while the reflection of light with its plane of polarization parallel to the transverse direction is still negligible. Differences between the transverse axis associated indices of refraction of adjoining layers after stretching should be less than 0.05 and preferably less than 0.02. Another possibility is that the selected polymer exhibits some positive birefringence due to stretching, but this can be relaxed to match the refractive index of the transverse axis of the PEN layers in a heat treatment. The temperature of this heat treatment should not be so high as to relax the birefringence in the PEN layers.

The preferred selected polymer for the polarizer of the present invention is a copolyester of the reaction product of a naphthalene dicarboxylic acid or its ester such as dimethyl naphthalate ranging from 20 mole percent to 80 mole percent and isophthalic or terephthalic acid or their esters such as dimethyl terephthalate ranging from 20 mole percent to 80 mole percent reacted with ethylene glycol. Other copolyesters within the scope of the present invention have the properties discussed above and have a refractive index associated with the transverse axis of approximately 1.59 to 1.69. Of course, the copolyester must be coextrudable with PEN. Other suitable copolyesters are based on isophthalic, azelaic, adipic, sebacic, dibenzoic, terephthalic, 2,7- naphthalene dicarboxylic, 2,6-naphthalene dicarboxylic or cyclohexanedicarboxylic acids. Other suitable variations in the copolyester include the use of ethylene glycol, propane diol, butane diol, neopentyl glycol, polyethylene glycol, tetramethylene glycol, diethylene glycol, cyclohexanedimethanol, 4-hydroxy diphenol, propane diol, bisphenol A, and 1,8-dihydroxy biphenyl, or 1,3-bis(2-hydroxyethoxy)benzene as the diol reactant. A volume average of the refractive indices of the monomers would be a good guide in preparing useful copolyesters. In addition, copolycarbonates having a glass transition temperature compatible with the glass transition temperature of PEN and with a refractive index associated with the transverse axis of approximately 1.59 to 1.69 are also useful as a selected polymer in the present invention. Formation of the copolyester or copolycarbonate by transesterification of two or more polymers in the extrusion system is another possible route to a viable selected polymer.

Referring to FIG. 30, two component orthogonal biaxial birefringent systems 300 and the design considerations affecting the resultant optical properties will now be described. Again, the system can have many layers, but an understanding of the optical behavior of the stack is achieved by examining the optical behavior at one interface. In the figure, "no" again refers to the refractive index of the surrounding isotropic media.

A biaxial birefringent system can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result, the biaxial birefringent system acts as a polarizer, transmitting light of one polarization and reflecting light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Referring again to FIG. 30, the following values to the film indices are assigned for purposes of illustration: n1x=1.88, n1y=1.64, n1z=variable, n2x=1.65, n2y=variable, and n2z=variable. The x direction is referred to as the extinction direction and the y direction as the transmission direction.

Equation 1 can be used to predict the angular behavior of the biaxial birefringent system for two important cases of light with a plane of incidence in either the stretch (xz plane) or the non-stretch (yz plane) directions. The polarizer is a mirror in one polarization direction and a window in the other direction. In the stretch direction, the large index differential of 1.88−1.65=0.23 in a multilayer stack with hundreds of layers will yield very high reflectivities for s-polarized light. For p-polarized light the reflectance at various angles depends on the n1z/n2z index differential.

In many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a narrow bandpolarizer across a 100 nm bandwidth is desirably at least 50%, preferably at least 70% and more preferably at least 90%. The average transmission at 60 degrees from the normal for p-polarized light (measured along the transmission axis) for a narrow band polarizer across a 100 nm bandwidth is desirably at least 50%, preferably at least 70% and more preferably at least 80%.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis) for a polarizer from 400–700 nm is desirably at least 50%, preferably at least 70%, more preferably at least 80%, and even more preferably at least 90%.

For certain applications, high reflectivity in the transmission axis at off-normal angles are preferred. The average reflectivity for light polarized along the transmission axis should be more than 20% at an angle of at least 20 degrees from the normal.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{\mathrm{RMS}} = \frac{\int_{\lambda 1}^{\lambda 2} \left((T - \overline{T})^2\right)^{1/2} d\lambda}{\overline{T}}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest.

For applications where a low color polarizer is desirable, the % RMS color should be less than 10%, preferably less than 8%, more preferably less than 3.5%, and even more preferably less than 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than 50%, preferably less than 30%, more preferably less than 10%, and even more preferably less than 3%. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Reflectivity at off-normal angles, for light with its plane of polarization parallel to the transmission axis may be caused by a large z-index mismatch, even if the in-plane y indices are matched. The resulting system thus has large reflectivity for p, and is highly transparent to s polarized light. This case was referred to above in the analysis of the mirror cases as a "p polarizer".

For uniaxially stretched polarizers, performance depends upon the relationships between the alternating layer indices for all three (x, y, and z) directions. As described herein, it is desirable to minimize the y and z index differentials for a high efficiency polarizer. Introduction of a y-index mismatch is described to compensate for a z-index mismatch. Whether intentionally added or naturally occurring, any index mismatch will introduce some reflectivity. An important factor thus is making the x-index differential larger than the y- and z-index differentials. Since reflectivity increases rapidly as a function of index differential in both the stretch and non-stretch directions, the ratios $\Delta ny/\Delta nx$ and $\Delta nz/\Delta nx$ should be minimized to obtain a polarizer having high extinction along one axis across the bandwidth of interest and also over a broad range of angles, while preserving high transmission along the orthogonal axis. Ratios of less than 0.05, 0.1 or 0.25 are acceptable. Ideally, the ratio $\Delta nz/\Delta nx$ is 0, but ratios of less than 0.25 or 0.5 also produce a useable polarizer.

It is understood from the foregoing that this relationship of $\Delta nz$ to $\Delta nx$ is also applicable to multilayer mirrors, where Δnx=Δny in the case of a symmetric mirror, and Δnx>Δny in the case of an asymmetric mirror. Restated in mathematical terms, Δnz=0, but also useable is Δnz<0.05k, Δnz<0.1k, Δnz<0.25k, or Δnz<0.5k, where k is the larger of Δnx and Δny.

Figure 25:
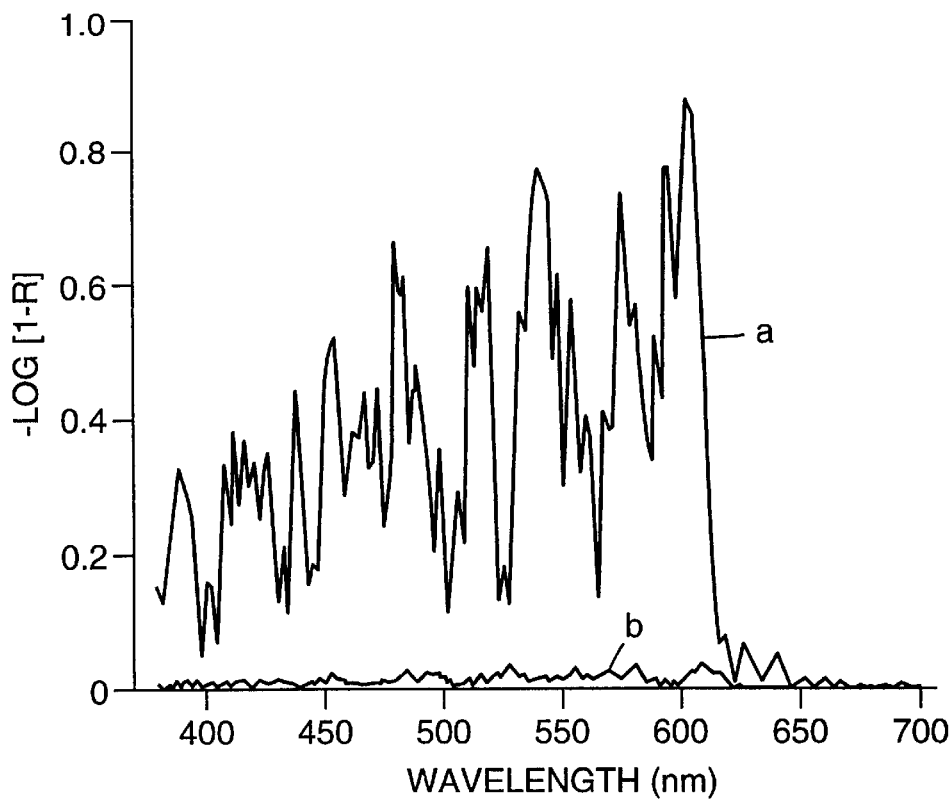
FIG. 25 shows off axis reflectivity versus wavelength for two different biaxial birefringent systems.

FIG. 25 shows the reflectivity (plotted as—Log[1−R]) at 75° for p polarized light with its plane of incidence in the non-stretch direction, for an 800 layer stack of PEN/coPEN. The reflectivity is plotted as function of wavelength across the visible spectrum (400–700 nm). The relevant indices for curve a at 550 nm are n1y=1.64, n1z=1.52, n2y=1.64 and n2z=1.63. The model stack design is a linear thickness grade for quarterwave pairs, where each pair thickness is given by dn=do+do(0.003)n. All layers were assigned a random thickness error with a gaussian distribution and a 5% standard deviation.

Curve a shows high off-axis reflectivity across the visible spectrum along the transmission axis (the y-axis) and that different wavelengths experience different levels of reflectivity. This is due to the large z-index mismatch (Δnz=0.11). Since the spectrum is sensitive to layer thickness errors and spatial nonuniformities, such as film caliper, this gives a biaxial birefringent system with a very nonuniform and "colorful" appearance. Although a high degree of color may be desirable for certain applications, it is desirable to control the degree of off-axis color, and minimize it for those applications requiring a uniform, low color appearance, such as liquid crystal displays or other types of displays.

Off-axis reflectivity, and off-axis color can be minimized by introducing an index mismatch to the non-stretch in-plane indices (n1y and n2y) that create a Brewster condition off axis, while keeping the s-polarization reflectivity to a minimum.

Figure 26:
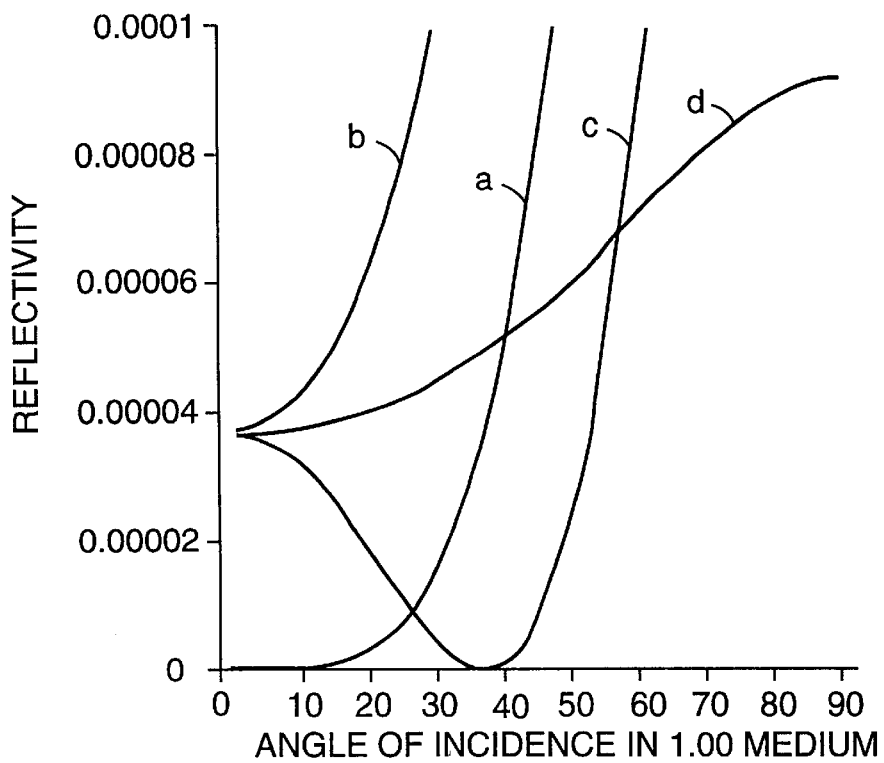
FIG. 26 shows the effect of introducing a y-index difference in a biaxial birefringent film with a large z-index difference.

FIG. 26 explores the effect of introducing a y-index mismatch in reducing off-axis reflectivity along the transmission axis of a biaxial birefringent system. With n1z=1.52 and n2z=1.63 (Δnz=0.11), the following conditions are plotted for p polarized light: a) n1y=n2y=1.64; b) n1y=1.64, n2y=1.62; c) n1y=1.64, n2y=1.66. Curve a show reflectivity where the in-plane indices n1y and n2y are equal. Curve a has a reflectance minimum at 0°, but rises steeply after 20°. For curve b, n1y >n2y, and reflectivity increases rapidly. Curve c, where n1y<n2y, has a reflectance minimum at 38°, but rises steeply thereafter. Considerable reflection occurs as well for s polarized light for n 1 y≠n2y, as shown by curve d. Curves a–d of FIG. 26 indicate that the sign of the y-index mismatch (n1y−n2y) should be the same as the z-index mismatch (n1z−n2z) for a Brewster minimum to exist. For the case of n1y=n2y, reflectivity for s polarized light is zero at all angles.

By reducing the z-axis index difference between layers, the off axis reflectivity can be further reduced. If n1z is equal to n2z, FIG. 21 indicates that the extinction axis will still have a high reflectivity off-angle as it does at normal incidence, and no reflection would occur along the non-stretch axis at any angle because both indices are matched (e.g., n1y=n2y and n1z=n2z).

Exact matching of the two y indices and the two z indices may not be possible in some multilayer systems. If the z-axis indices are not matched in a polarizer construction, introduction of a slight mismatch may be desired for in-plane indices n1y and n2y. This can be done by blending additional components into one or both of the material layers in order to increase or decrease the respective y index. Blending a second resin into either the polymer that forms the highly birefringent layers or into the polymer that forms the selected polymer layers may be done to modify reflection for the transmission axis at normal and off-normal angles, or to modify the extinction of the polarizer for light polarized in the extinction axis. The second, blended resin may accomplish this by modifying the crystallinity and the index of refraction of the polymer layers after orientation.

Figure 27:
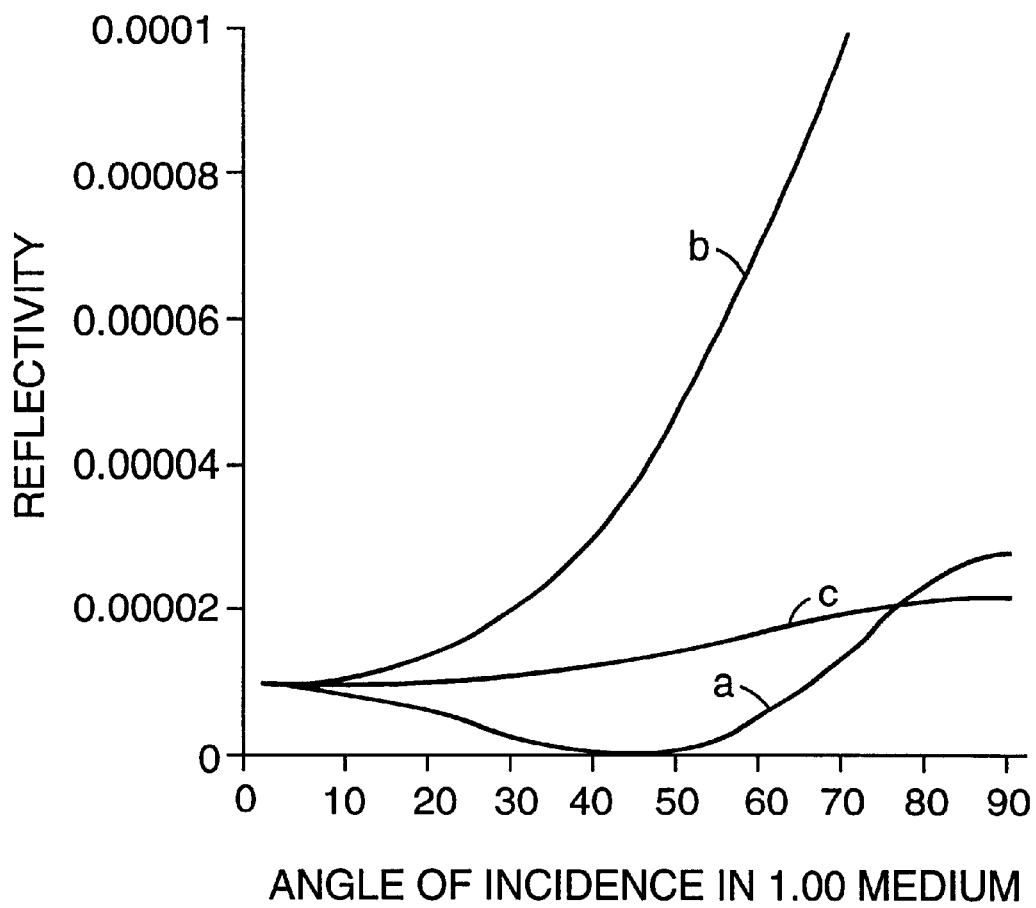
FIG. 27 shows the effect of introducing a y-index difference in a biaxial birefringent film with a smaller z-index difference.

Another example is plotted in FIG. 27, assuming n1z=1.56 and n2z=1.60 (Δnz=0.04), with the following y indices a) n1y=1.64, n2y=1.65; b) n1y=1.64, n2y=1.63. Curve c is for s-polarized light for either case. Curve a, where the sign of the y-index mismatch is the same as the z-index mismatch, results in the lowest off-angle reflectivity.

The computed off-axis reflectance of an 800 layer stack of films at 75° angle of incidence with the conditions of curve a in FIG. 27 is plotted as curve b in FIG. 25. Comparison of curve b with curve a in FIG. 25 shows that there is far less off-axis reflectivity, and therefore lower perceived color and better uniformity, for the conditions plotted in curve b. The relevant indices for curve b at 550 nm are n1y=1.64, n1z=1.56, n2y=1.65 and n2z=1.60.

Figure 28:
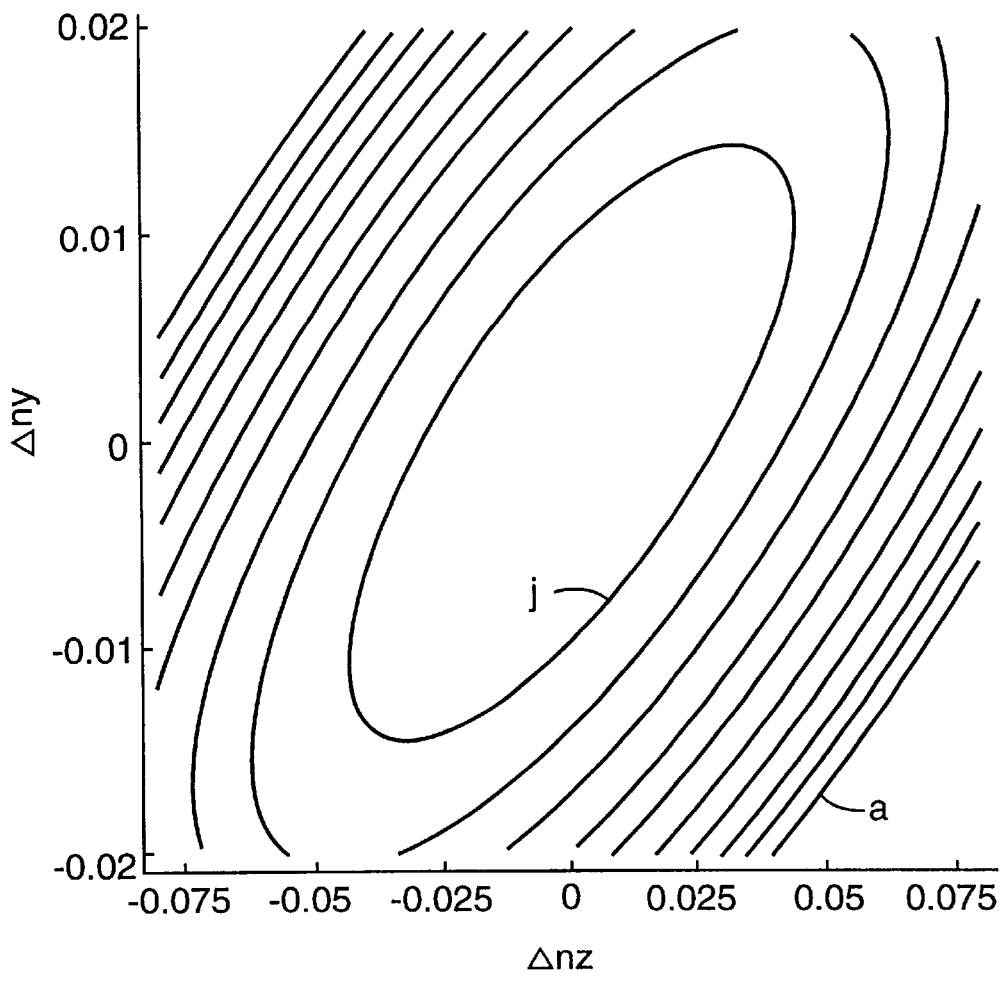
FIG. 28 show a contour plot summarizing the information from FIGS. 26 and 27.

FIG. 28 shows a contour plot of equation 1 which summarizes the off axis reflectivity discussed in relation to FIG. 30 for p-polarized light. The four independent indices involved in the non-stretch direction have been reduced to two index mismatches, Δnz and Δny. The plot is an average of 6 plots at various angles of incidence from 0° to 75° in 15 degree increments. The reflectivity ranges from $0.4 \times 10^{-4}$ for contour a, to $4.0 \times 10^{-4}$ for contour j, in constant increments of $0.4 \times 10^{-4}$. The plots indicate how high reflectivity caused by an index mismatch along one optic axis can be offset by a mismatch along the other axis.

Thus, by reducing the z-index mismatch between layers of a biaxial birefringent systems, and/or by introducing a y-index mismatch to produce a Brewster effect, off-axis reflectivity, and therefore off-axis color, are minimized along the transmission axis of a multilayer reflecting polarizer.

It should also be noted that narrow band polarizers operating over a narrow wavelength range can also be designed using the principles described herein. These can be made to produce polarizers in the red, green, blue, cyan, magenta, or yellow bands, for example.

An ideal reflecting polarizer should transmit all light of one polarization, and reflect all light of the other polarization. Unless laminated on both sides to glass or to another film with a clear optical adhesive, surface reflections at the air/reflecting polarizer interface will reduce the transmission of light of the desired polarization. Thus, it may in some cases be useful to add an antireflection (AR) coating to the reflecting polarizer. The AR coating is preferably designed to dereflect a film of index 1.64 for PEN based polarizers in air, because that is the index of all layers in the nonstretch (y) direction. The same coating will have essentially no effect on the stretch direction because the alternating index stack of the stretch direction has a very high reflection coefficient irrespective of the presence or absence of surface reflections. Any AR coating known in the art could be applied, provided that the coating does not overheat or damage the multilayer film being coated. An exemplary coating would be a quarterwave thick coating of low index material, ideally with index near the square root of 1.64 (for PEN based materials). For a typical fluorescent lamp, the RFP yields an increase of 1.5–1.6 times more light in a given polarization as compared to the same source used without the RFP and an even larger increase compared to the same source used with an absorptive dichroic polarizer. The absorption is much less than that for a dichroic polarizer, and the angle and wavelength performance better than that obtainable with a vacuum coated bulk optic.

In addition, combining, the RPF with the diffuse source as shown in FIGS 5A–5D polarizes the light at the source, thus reducing requirements on the cosmetic quality of the RPF. The result is an increase in the amount of polarized light produced, while using less RPF, and relaxed manufacturing requirements due to the reduced requirements on the RPF's cosmetic quality.

The preferred reflector 109 is a multilayer birefringent mirror of the type described in the above-mentioned U.S. patent application Ser. No. 08/402,041.

Figure 6:
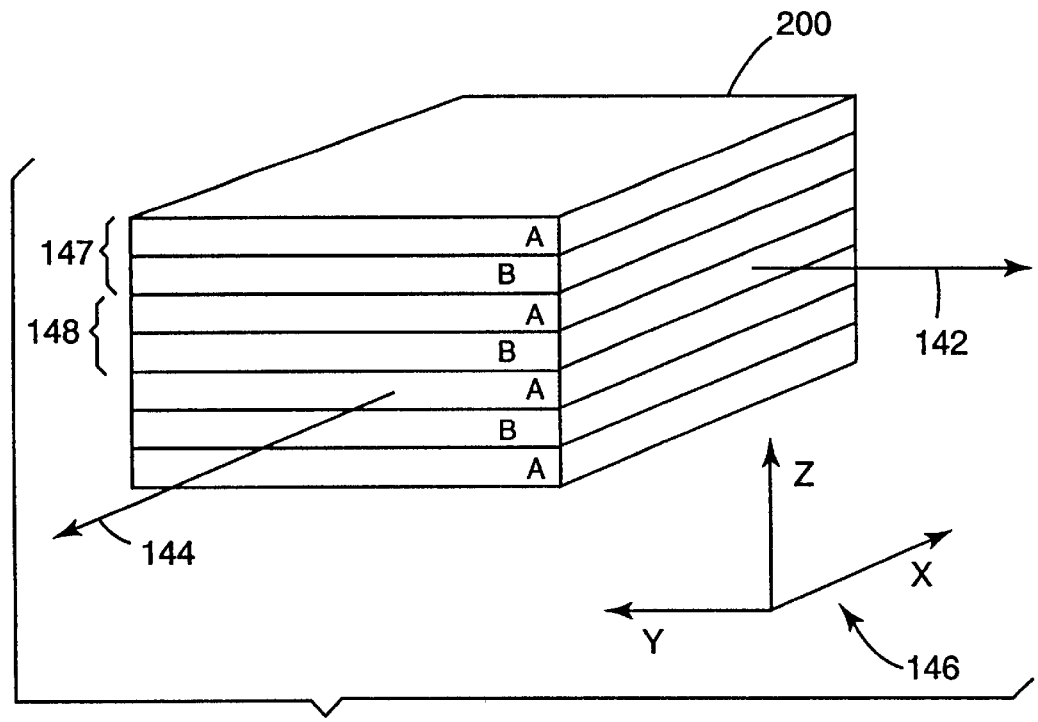
FIG. 6 is an exaggerated cross sectional view of the preferred multilayer reflective polarizing film.

FIG. 6 is a schematic perspective diagram of a segment of an exemplary multilayer stack 200 from which the preferred RPF and multilayer mirror can be made. The figure includes a coordinate system 146 that defines X, Y and Z directions that are referred to in the description of the RPF 108.

An illustrative multilayer stack 200 shown in FIG. 6 is made of alternating layers (ABABA . . . ) of two different materials, material "(A)" and material "(B)". Each layer in the multilayer stack 200 has indices of refraction associated with each direction x, y and z, referred to as $n_x$, $n_y$ and $n_z$. Pairs of adjacent layers are labeled 147, 148. The optical behavior of the multilayer stacks are described in detail in the above-mentioned U.S. patent application Ser. No. 08/402,041, but will be described briefly here.

The relationships between the indices of refraction in each film layer to each other and to the indices of refraction of the other layers in the film stack determine the optical behavior of the multilayer stack. A reflecting polarizer can be made by uniaxially stretching a multilayer stack 200 such as that shown in FIG. 6 in which at least one of the materials in the stack has its index of refraction affected by the stretching process. Uniaxial stretching results in refractive index differences between adjoining layers in the stretch direction. The resultant stack will reflect light having its plane of polarization in the stretch direction while light having its plane of polarization in the nonstretch direction is transmitted.

A multilayer mirror can be made by biaxially stretching a multilayer stack 200 such as that shown in FIG. 6. Biaxial stretching of the multilayer stack results in refractive index differences in both stretch directions 142, 144, thus resulting in high reflectivity for light in both planes of polarization.

Figure 7A:
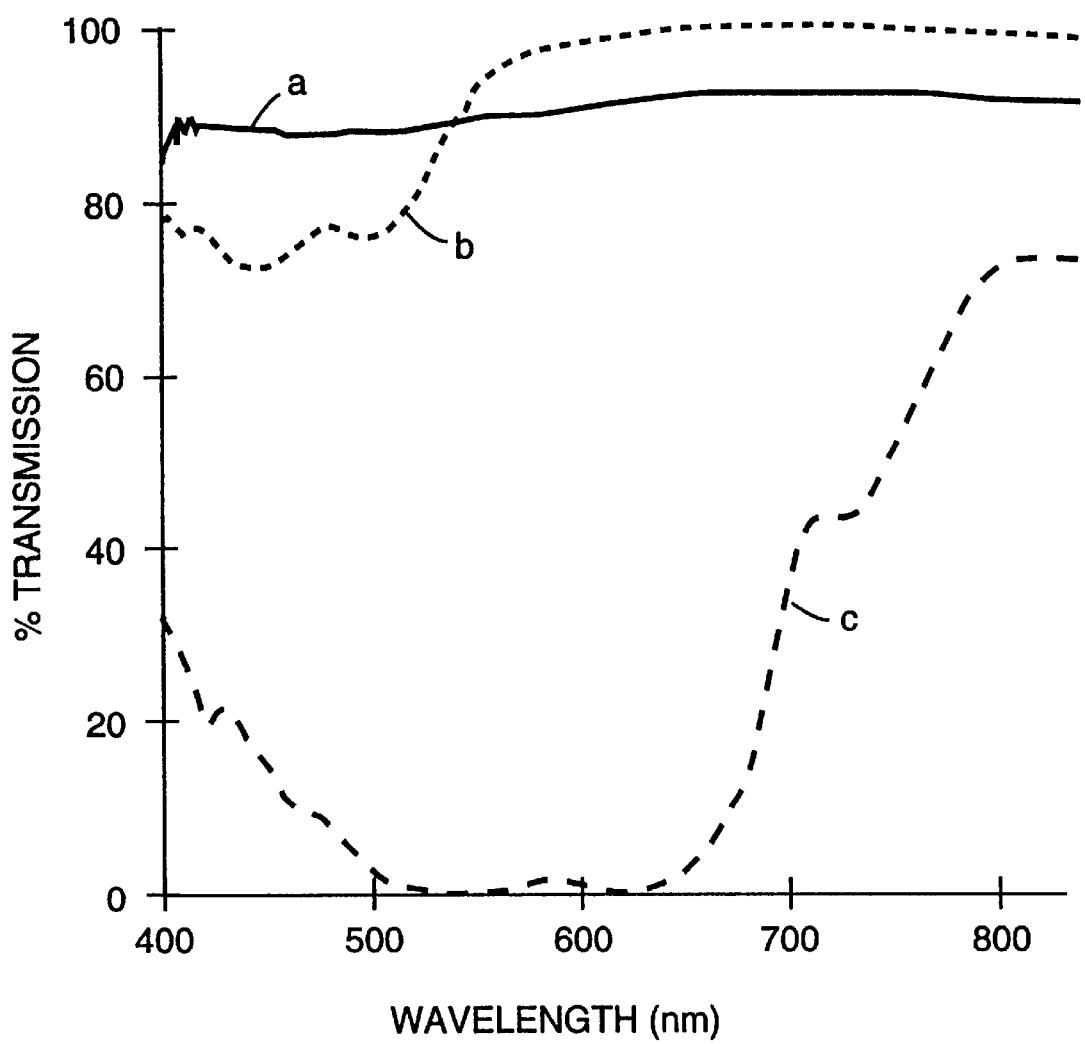
FIGS. 7A–7C show graphs of the performance of the preferred multilayer reflective polarizing film and multilayer mirror.
Figure 7B:
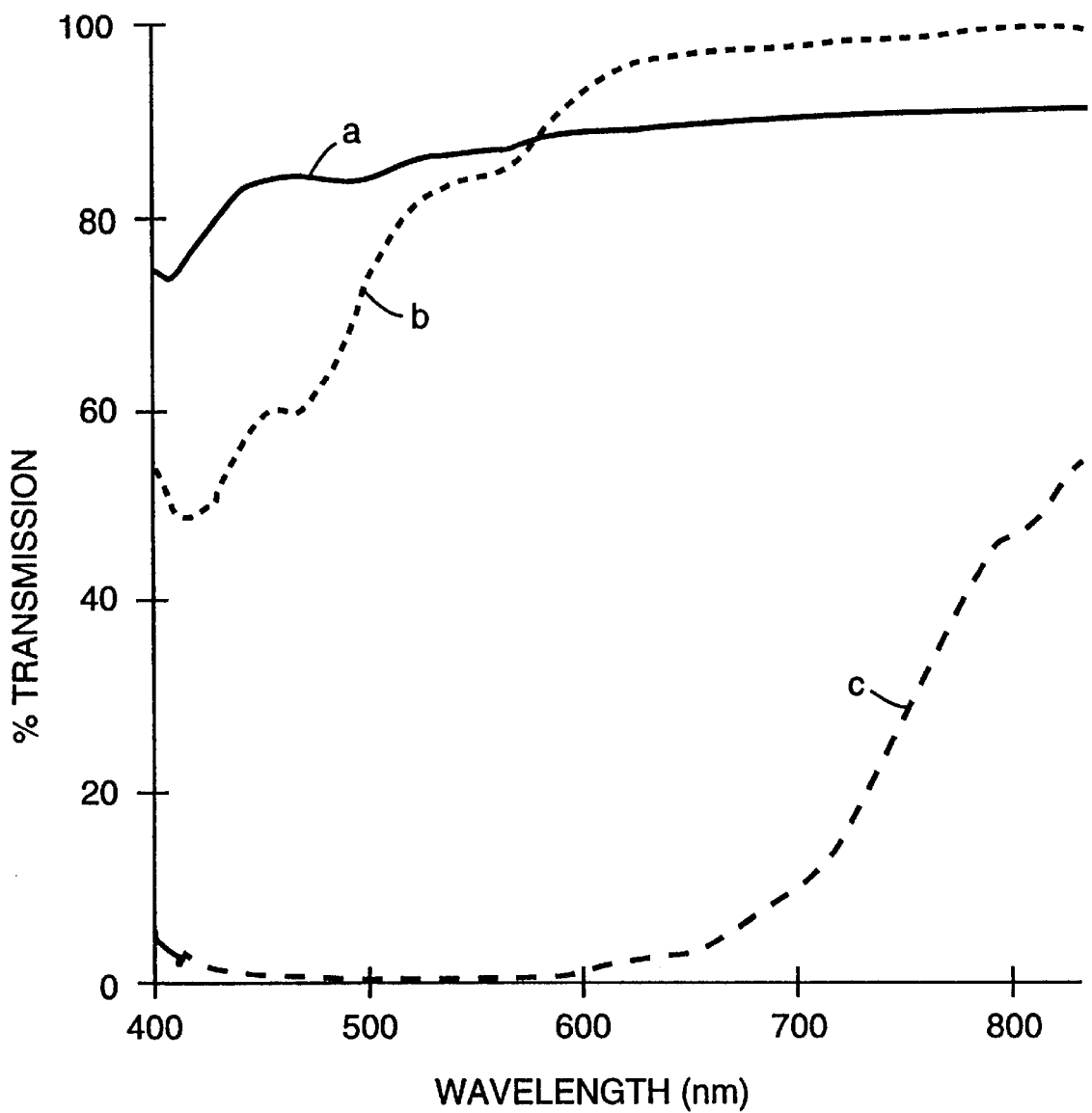

FIGS. 7A and 7B show transmission of exemplary reflective polarizing films. These two films are described in more detail in the above-mentioned U.S. patent application Ser. No. 08/402,041.

The reflective polarizing film of FIG. 7A is a multilayer stack of a polyethylene napthalate (PEN) and a copolymer of 70 mole % 2,6 napthalene dicarboxylate methyl ester, 15% dimethyl isophthalate and 15% dimethyl terphthalate with ethylene glycol (coPEN). (See example 10 of U.S. patent application Ser. No. 08/402,041.) Curve a shows transmission of light with its plane of polarization in the nonstretch direction at normal incidence, curve b shows transmission of light with its plane of polarization in the nonstretch direction at 60° incidence, and curve c shows its transmission of light polarized in the stretch direction at normal incidence.

The reflective polarizing film of FIG. 7B is a multilayer stack of PEN and a synchotactic polystyrene (sPS). (See example 11 of above-mentioned U.S. patent application Ser. No. 08/402,041.) Curve a shows transmission of light with its plane of polarization in the nonstretch direction at normal incidence, curve b shows transmission of light with its plane of polarization in the nonstretch direction at 60° incidence, and curve c shows its transmission of light polarized in the stretch direction at normal incidence.

The randomization that occurs within the diffuse source also alters the direction of the incident light so that a significant amount of light exits the diffuse source off-axis. Consequently, the path of such light in the reflective polarizing element is longer than the path length for near normal light. This effect must be addressed to optimize the optical performance of the system. Unlike dichroic polarizers, or the bulk optic reflective polarizers described herein, the preferred multilayer RPF 108 is capable of broadband reflectance at normal incidence into the longer wavelengths which is desirable to accommodate off-axis rays at shorter wavelengths.

The embodiments of the present polarized light source using the preferred RPF thus have several advantages. The reflection and randomization process achieved with the diffuse source and RPF gives a polarized source that is very efficient. The broadband reflectivity provided by the RPF means that efficiency is achieved over a broad spectral range. In addition, the RPF provides high off-angle reflectivity of the rejected polarization. These features make the RPF/diffuse source combination useful over a broader range of the optical spectrum and over a broader range of angles than the embodiments incorporating bulk optic components.

In addition, the RPF is lightweight, thin and flexible, which makes it good for applications requiring low bulk and light weight. The RPF also conforms well to the lamp surface and could be incorporated into the lamp manufacture.

Figure 7C:
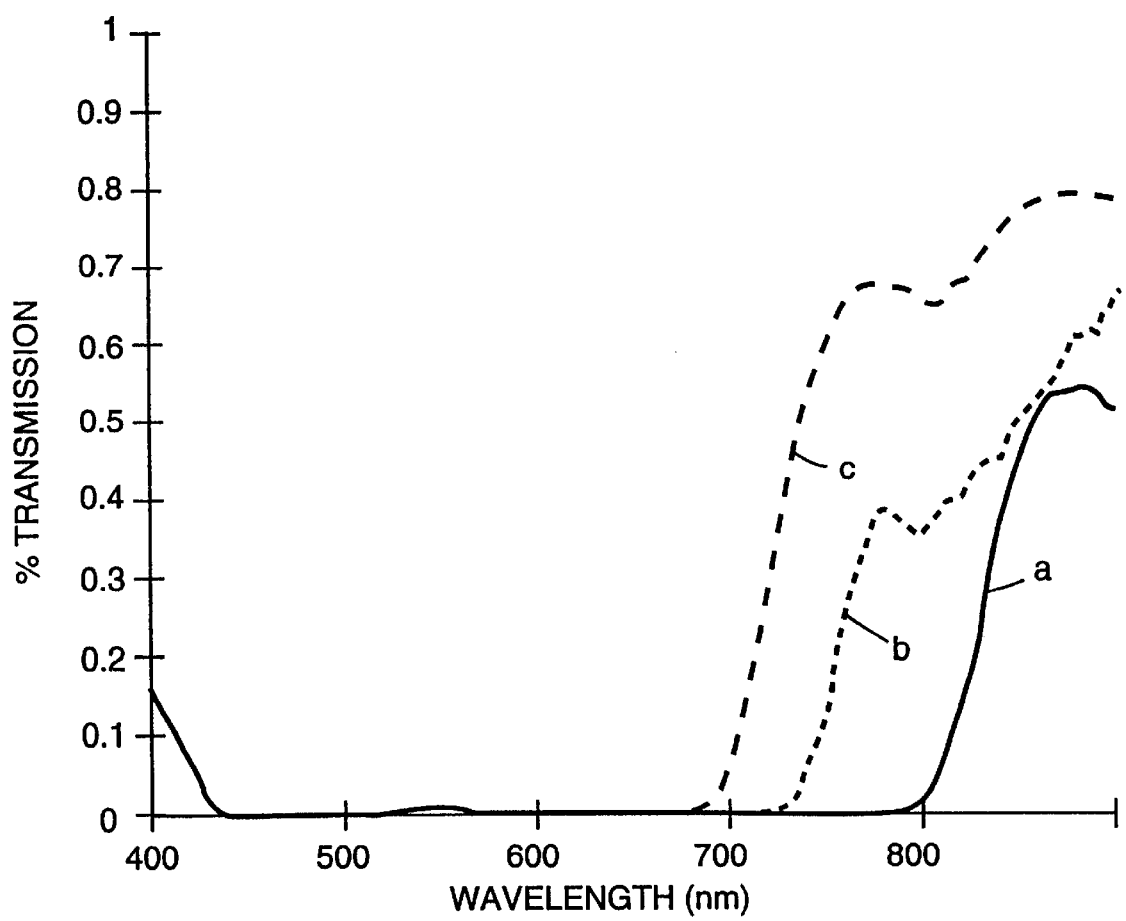

The preferred mirror is constructed in a fashion similar to the RPF, except that the film is biaxially stretched. FIG. 7C shows the spectra for the multilayer mirror made according to the following:

PEN:PMMA Mirror A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layuers at a total rate of 50 pounds per hour of PEN from extruder A. The web was length oriented to a draw ratio of about 3.2 with the web temperature at about 280° F. The film was subsequently preheated to about 310° F in about 38 seconds and drawn in the transverse direction to a draw ratio of about 4.5 at a rate of about 11% per second. The film was then heat-set at 440° F. with no relaxation allowed. The finished film thickness was about 3 mil.

As seen in FIG. 7C, curve a, the bandwidth at normal incidence is about 350 nm with an average in-band extinction of greater than 99%. At an incidence angle of 50° from the normal both s (curve b) and p-polarized (curve C) light showed similar extinctions, and the bands were shifted to shorter wavelengths as expected. The red band-edge for s-polarized light is not shifted to the blue as much as for p-polarized light due to the expected larger bandwith for s-polarized light.

Figure 8A:
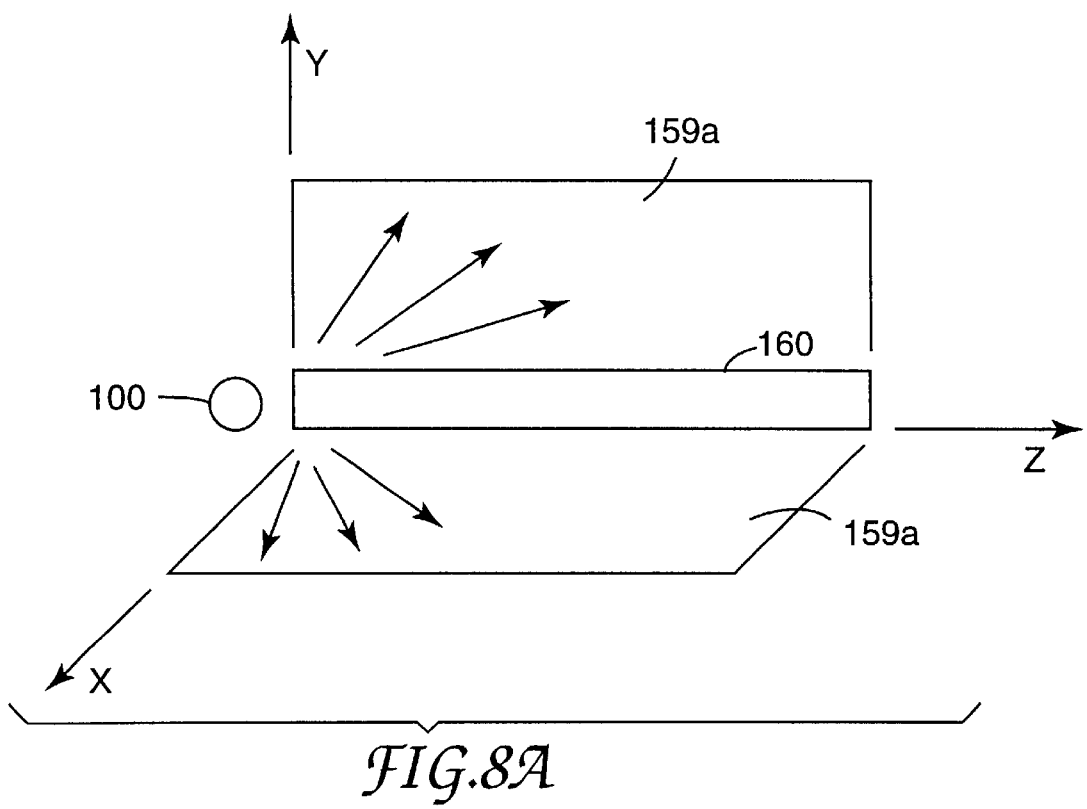
FIGS. 8A–8D show the present polarized light source configured with light guides for directing the polarized light.

FIG. 8A shows the present polarized light source 100 and a light guide 160 for delivering the polarized light emitted by polarized light source 100 to an associated optical display. The polarized source preferably polarizes light in the YZ (159*a*) or XZ (159*b*) plane for maximum polarization control in the light guide. For purposes of the present invention, the light guide 160 preferably has the ability to maintain the polarization state of the light emitted by the polarized light source 100. Any light guide which satisfies this requirement is appropriate for purposes of the present invention.

Figure 8B:
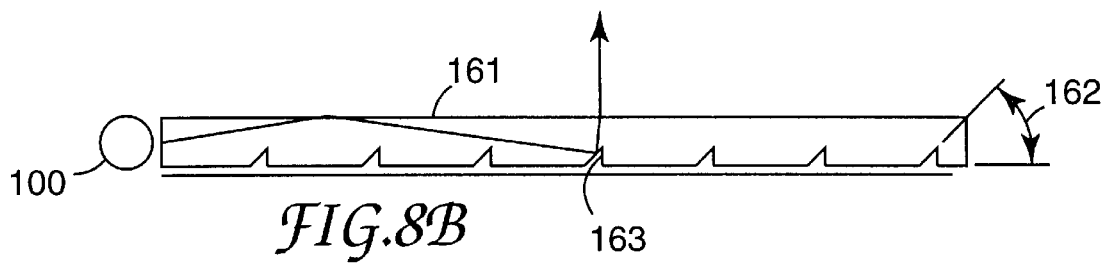
Figure 8C:
Figure 8D:
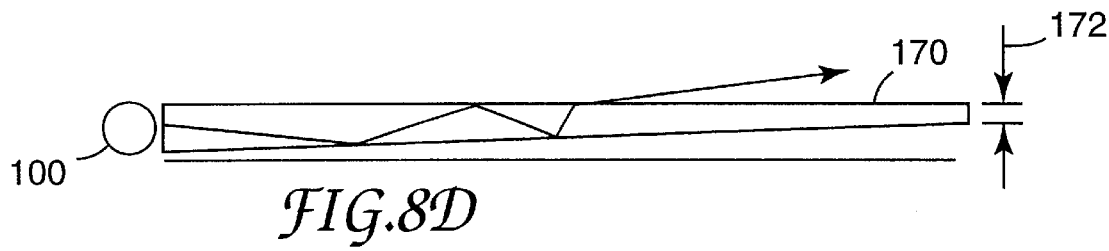

FIGS. 8B–8D show the present polarized light source 100 with three exemplary light guides 161, 166, and 170. As stated above, the light guide used with the present polarized light source 100 preferably maintains the polarization state of the light produced by the polarized light source 100. Each of the exemplary light guides shown in FIGS. 8B–8E satisfy this polarization preserving characteristic. It shall be understood that the light guides shown in FIGS. 8B–8E are shown for purposes of illustration only and are in no way intended to limit the appropriate light guides for use with the present polarized light source. On the contrary, as discussed above, any light guide meeting the polarization preserving requirement can be substituted for any of the light guides shown in FIGS. 8B–8E without departing from the spirit and scope of the present invention.

The light guides 8B–8D are typically constructed of acrylic, but could be any optical material. To ensure elimination of stress induced birefringence, the light guide could be filled with a transparent liquid or gel dielectric material.

The faceted light guide shown in FIG. 8B and the stepped wedge light guide of FIG. 8C extract light in the same manner. A light ray is reflected along the guide by total internal reflection. The ray continues until incident on a facet (such as facet 163 in FIG. 8B or facet 165 in FIG. 8C). The facet reflects the light through opposing surfaces of the guide. These guides are designed to emit much of the light through the surface opposite the facet without either a specular or diffuse back reflector. Adding a back reflector will increase the amount of light directed through the front surface of the guide.

The faceted light guide of FIG. 8B is a constant thickness guide designed to extract light uniformly over the length of the guide. The facet angle is indicated as angle 162. The light presented to each facet is assumed to be substantially the same in angular distribution, differing only in intensity. In FIG. 8B the facet spacing is varied along the guide length to provide this uniformity; the facets are closer together at the distal end of the guide. The facet depth can also be varied to provide uniformity. The facet spacing, facet depth and facet angle are chosen to extract a given amount of light from the guide, at a given rate, and direct it into a given angular region for a given size of guide.

The stepped light guide of FIG. 8C is a series of surfaces parallel to the top surface of the guide interspersed with a series of uniformly spaced 45 degree facets, such as facet 165. The rate of extraction is generally controlled by reducing the guide thickness rather than by placing the facets closer together.

The wedge light guide shown in FIG. 8D extracts light by forcing the incident ray angle to just exceed the critical angle for total internal reflection. This light is then removed from the guide within a narrow cone, yielding a higher brightness than if the same amount of optical power was distributed over a larger angle. Approximately one half the emitted light comes directly from the top surface of the guide. The rest of the light is emitted from the bottom surface of the guide. Use of a high reflectance, specular mirror (not shown) can be used to redirect the otherwise lost light back through the top surface of the guide.

As shown in FIG. 8D, the thickness of a wedge light guide decreases as light progresses from the lamp to the distal end. The wedge angle is indicated by angle 172. The rate of extraction is controlled by the wedge angle 172 and the changing guide thickness. A larger wedge angle will increase the rate at which light is removed from the guide.

To determine which guide is best suited for a particular application, several factors must be considered. These include viewing angle, brightness, efficiency, ease of manufacture, optical design flexibility, usefulness for other geometries, and simplicity.

Because the present polarized light source and polarization preserving light guide results in an increased amount of light of the desired polarization, the need for an absorptive dichroic polarizer attached to an associated optical display is reduced.

FIG. 9 shows the present polarized light source 100 in a configuration useful for transflective optical displays. Such a display may be viewed in a transmissive (backlit) mode, in which the display is illuminated by polarized light source 100, or in a reflective mode, where the display is front lit under ambient lighting conditions.

In the transmissive mode, a polarized light source 100 injects light into the polarization preserving light guide 180, as indicated by ray 186. The polarization preserving light guide 180 may be any one of the light guides shown and described above with respect to FIGS. 8A–8D, or any other light guide that preserves the polarization of the light injected therein. The polarized light source 100 is preferably backed with a diffuse reflector 109 to increase the amount of light scatter and randomization. The light injected reflects off of the light guide 180 and then exits the guide 180 for illumination of an associated optical display.

The light guide 180 is backed by a brushed metal or other diffuse reflecting surface 182 for use in reflective mode. Ambient light, represented by ray 184, passes through the associated optical display, through the light guide 180 and is reflected off of surface 182. The scattered light provides contrast for viewing the associated optical display.

The present polarized light source therefore provides many features and advantages. Display brightness is controlled by adjusting the viewing angle, the display area, the absorption losses and the polarization. By polarizing the light immediately at the source, the present polarized light source allows the remaining variables to be independently optimized to provide the desired luminance, viewing angle, and display area.

FIG 10A shows the glare problem associated with a typical unpolarized source 190 in a task lighting situation. Light of polarization (a) indicated by ray 193 is transmitted through the task lighting surface 192 (such as a computer monitor), while light of polarization (b) indicated by ray 199 is reflected, creating glare. In FIG 10B, however the present polarized source 100 is used. In this configuration, because a very high percentage of the light emitted from the polarized source is in polarization (a) indicated by ray 195 and is transmitted, glare is reduced.

FIG 10C shows a task lighting situation such as a vehicle dashboard display. A reflective polarizing element 104 is placed over the EL panel 103 of a typical vehicle dashboard display. Without reflective polarizing element 104, glare would occur off of windshield 196. However, reflective polarizing element 104 means that the light indicated by ray 197 is all of one polarization and is therefore transmitted through the windshield 196 instead of a portion being reflected and producing glare.

Figure 11A:
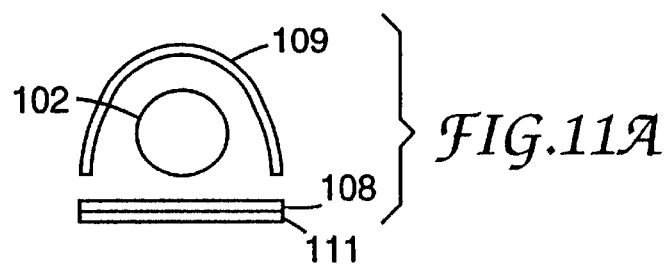
FIGS. 11A–11B show the present polarized light source in fluorescent fixture application.

FIG. 11A shows an embodiment of the polarized light source in a fluorescent fixture such as those used in an office lighting environment. In this embodiment, the fluorescent fixture includes a fluorescent lamp 102 and reflector 109. RFP 108 is placed on the output side of the fluorescent fixture over diffusing grid 111. Preferably, reflector 109 is a multilayer mirror such as that described above with respect to FIG. 7C.

Figure 11B:
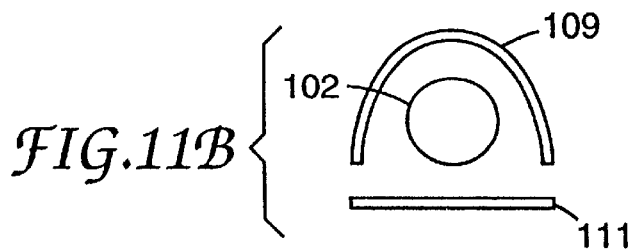

In applications where glare reduction is not required or necessary, the embodiment of FIG. 11B can be used. In this embodiment, fluorescent source 102 is back reflected by multilayer mirror 109 in a fluorescent fixture covered by diffuse grid 111. In both the embodiments of FIGS. 11A and 11B, the multilayer mirror provides several advantages over vapor coated metal mirrors traditionally used in lighting fixtures. First, the preferred multilayer mirrors have less diffuse reflectance (less than 2%) as compared to mirrors made by vapor coating a metal such as silver onto a substrate (diffuse reflectance of 5–6%). Also, the preferred multilayer mirror has a very flat spectral response across the visible spectrum. In contrast, vapor coated silver mirrors are more reflective in the red than in the blue, thus changing the apparent color of the light fixture. Because the multilayer mirror contains no metal, it eliminates corrosion problems experienced by vapor coated silver mirrors. Next, the preferred multilayer mirror has higher reflectivity, greater than 99%, as compared to vapor coated silver mirrors, which have reflectivities on the order of 92–93%. In addition, the multilayer mirror can be manufactured at a lower cost than vapor coated silver mirrors.

We claim:

1. A light fixture comprising:
   (a) a light source;
   (b) a multilayer mirror positioned to reflect light emitted by the light source toward an output side of the light fixture; and
   (c) a reflective polarizer positioned to transmit light of a desired polarization, and to reflect light of another polarization back into the light source and the mirror,
   wherein the multilayer mirror comprises alternating layers of at least a first layer type comprising a first polymeric material and a second layer type comprising a second polymeric material, wherein a difference in indices of refraction between the two layer types is $\Delta x$ along a first in-plane axis, $\Delta y$ along a second in-plane axis perpendicular to the first in-plane axis, and $\Delta z$ along a third axis mutually orthogonal to the first and second axes, and wherein $|\Delta z|$ is less than about $0.5k$, where k is the larger of $|\Delta x|$ and $|\Delta y|$.

2. The light fixture of claim 1, wherein the fixture comprises a task light.

3. The light fixture of claim 1, wherein the light source is a source which emits light having a high degree of scatter or randomization for polarization and direction of light.

4. The light fixture of claim 1, wherein the light source is an incandescent lamp, a fluorescent lamp, a solid-state source, or an electroluminescent light source.

5. The light fixture of claim 1, wherein said mirror comprises alternating layers of PEN and PMMA.

6. The light fixture of claim 1, wherein said mirror has a reflectivity of greater than 99%.

7. The light fixture of claim 1, wherein said reflective polarizer comprises alternating layers of PEN and coPEN.

8. The light fixture of claim 1, wherein the polarizer is wrapped at least partly around the light source.

9. The light fixture of claim 8, wherein the light source is a fluorescent lamp.

* * * * *